United States Patent
Iwaizumi et al.

(10) Patent No.: US 9,874,448 B2
(45) Date of Patent: Jan. 23, 2018

(54) ELECTRIC DEVICE AND INFORMATION DISPLAY METHOD

(71) Applicant: KYOCERA CORPORATION, Kyoto (JP)

(72) Inventors: Tomoki Iwaizumi, Osaka (JP); Keisuke Nagata, Hyogo (JP)

(73) Assignee: KYOCERA CORPORATION, Kyoto (JP)

( * ) Notice: Subject to any disclaimer, the term of this patent is extended or adjusted under 35 U.S.C. 154(b) by 43 days.

(21) Appl. No.: 15/053,961

(22) Filed: Feb. 25, 2016

(65) Prior Publication Data

US 2016/0178380 A1 Jun. 23, 2016

Related U.S. Application Data

(63) Continuation of application No. PCT/JP2014/072552, filed on Aug. 28, 2014.

(30) Foreign Application Priority Data

Aug. 28, 2013 (JP) ................................. 2013-177157

(51) Int. Cl.
| | |
|---|---|
| G01C 21/00 | (2006.01) |
| G01C 21/26 | (2006.01) |
| G01C 21/36 | (2006.01) |
| H04W 4/02 | (2009.01) |
| H04M 1/725 | (2006.01) |

(Continued)

(52) U.S. Cl.
CPC ......... *G01C 21/26* (2013.01); *G01C 21/3682* (2013.01); *H04W 4/02* (2013.01); *G01C 21/20* (2013.01); *G06F 3/0488* (2013.01); *H04M 1/72572* (2013.01); *H04M 1/72583* (2013.01)

(58) Field of Classification Search
CPC .... G01C 21/26; G01C 21/3682; G01C 21/20; H04W 4/02; G06F 3/0488; H04M 1/72572; H04M 1/72583; H04N 5/2257
USPC ........................ 701/400, 408, 409, 412, 416
See application file for complete search history.

(56) References Cited

U.S. PATENT DOCUMENTS

| | | | |
|---|---|---|---|
| 7,822,545 B2 | 10/2010 | Kanda et al. | |
| 8,059,032 B2 | 11/2011 | Tobe et al. | |
| 2014/0085445 A1* | 3/2014 | Joao ................... | G01C 21/3679 348/61 |

FOREIGN PATENT DOCUMENTS

| | | |
|---|---|---|
| JP | 2011-118193 A | 4/2001 |
| JP | 2006-194665 A | 7/2006 |
| JP | 2006-287553 A | 10/2006 |

(Continued)

OTHER PUBLICATIONS

DOCOMO Navi Widget, [online], Oct. 20, 2011, URL:https://web.archive.org/web/20111020132317/http://www.nttdocomo.com.jp/service/information/map_navi/feature/chizunavi_widget/, retrieval date Nov. 11, 2014, in 2 pages.

(Continued)

*Primary Examiner* — Gertrude Arthur Jeanglaude
(74) *Attorney, Agent, or Firm* — Duane Morris LLP

(57) ABSTRACT

An electric device includes a location detector, a display, and at least one processor. The location detector detects a current position. The display displays an object for performing an application in an area of a screen. At least one processor acquires information of one or more geographic locations near the current position from a database, and causes the display to display the information in the area.

12 Claims, 20 Drawing Sheets

(51) Int. Cl.
   *G01C 21/20*   (2006.01)
   *G06F 3/0488*   (2013.01)

(56) References Cited

FOREIGN PATENT DOCUMENTS

| JP | 2010-008162 A | 1/2010 |
| JP | 2010-101785 A | 5/2010 |
| JP | 2011-70582 A | 4/2011 |
| JP | 2012-108096 A | 6/2012 |
| JP | 2012-242202 A | 12/2012 |

OTHER PUBLICATIONS

International Search Report in International Application No. PCT/JP2014/072552, dated Nov. 25, 2014, in 3 pages.
Written Opinion in International Application No. PCT/JP2014/072552, dated Nov. 25, 2014, and Statement of Relevance of Non-English References, in 7 pages.

\* cited by examiner

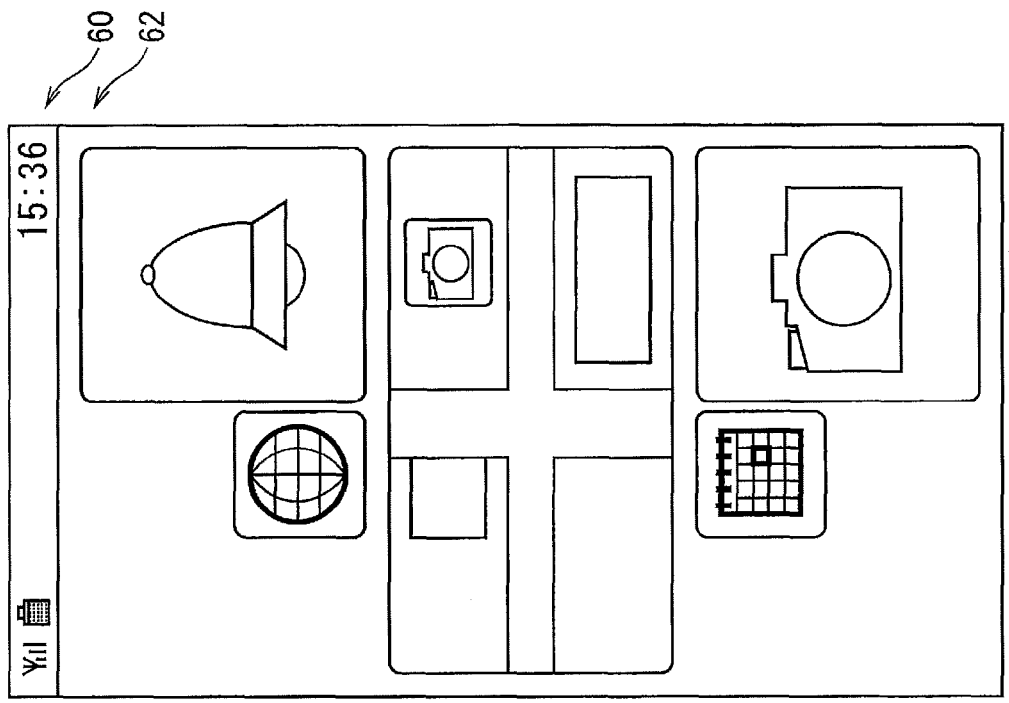
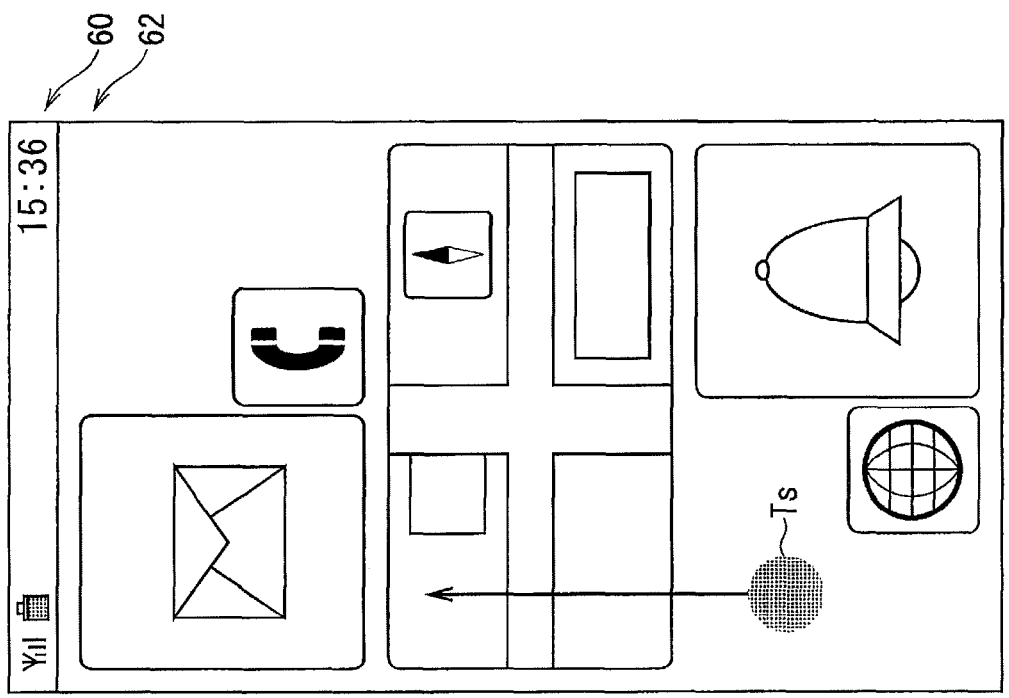

F I G. 1 0
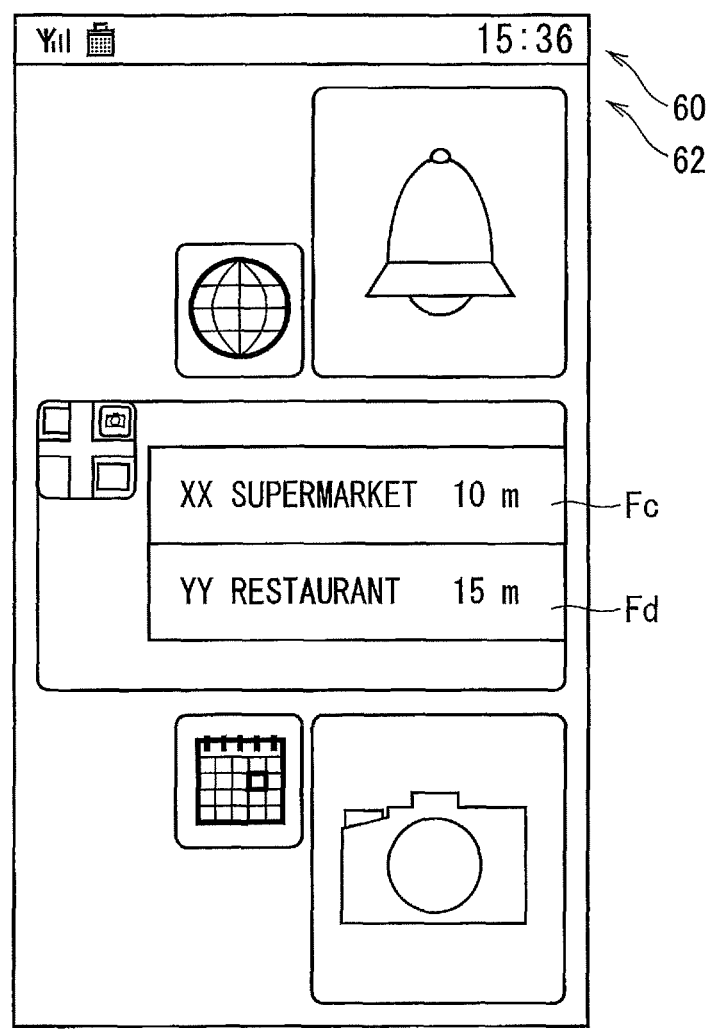

ELECTRIC DEVICE AND INFORMATION DISPLAY METHOD

CROSS-REFERENCE TO RELATED APPLICATIONS

The present application is a continuation of International Application No. PCT/JP2014/072552, filed on Aug. 28, 2014, which claims the benefit of Japanese Patent Application No. 2013-177157, filed on Aug. 28, 2013. International Application No. PCT/JP2014/072552 and Japanese Patent Application No. 2013-177157 are both entitled "PORTABLE COMMUNICATION TERMINAL, INFORMATION DISPLAY PROGRAM, AND INFORMATION DISPLAY METHOD". The contents of these applications are incorporated herein by reference in their entirety.

FIELD

Embodiments of the present disclosure relate to an electric device and an information display method, and, in particular, to an electric device and an information display method for detecting the current position.

BACKGROUND

A conventional mobile phone acquires its positional information, and, based on the positional information, acquires information on a map of surroundings from a map information holding server. A map is displayed on a display unit based on the acquired map information.

As another example of the conventional mobile phone, a camera mobile phone detects the direction of a camera, and, based on the detected direction of the camera, calculates the direction of movement on a captured image. An indicator of the direction of movement is provided to an image captured with the camera, and the resulting image is displayed on a display unit.

SUMMARY

An electric device and an information display method are disclosed. In one embodiment, an electric device includes a location detector, a display, and at least one processor. The location detector detects a current position. The display displays an object for performing an application in an area of a screen. The at least one processor acquires information of one or more geographic locations near the current position from a database, and causes the display to display the information in the area.

In one embodiment, an information display method is a method for use in an electric device including a location detector that detects a current position, a display that displays an object for performing an application in an area of a screen, and at least one processor. The at least one processor performs an acquisition step and a display processing step. The acquisition step is a step of acquiring information of one or more geographic locations near the current position from a database. The display processing step is a step of causing the display to display the information in the area.

BRIEF DESCRIPTION OF DRAWINGS

FIGS. 5A and 5B illustrate an example of an operation to scroll the home screen.

FIG. 10 illustrates an example of the state of displaying facility information in a second navigation tile.

DETAILED DESCRIPTION

Figure 1A:
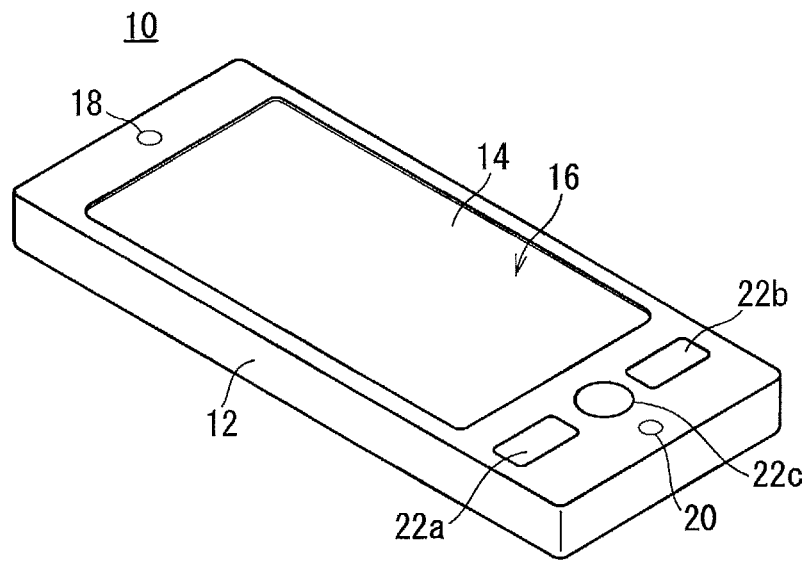
FIGS. 1A and 1B each illustrate the appearance of a mobile phone.
Figure 1B:
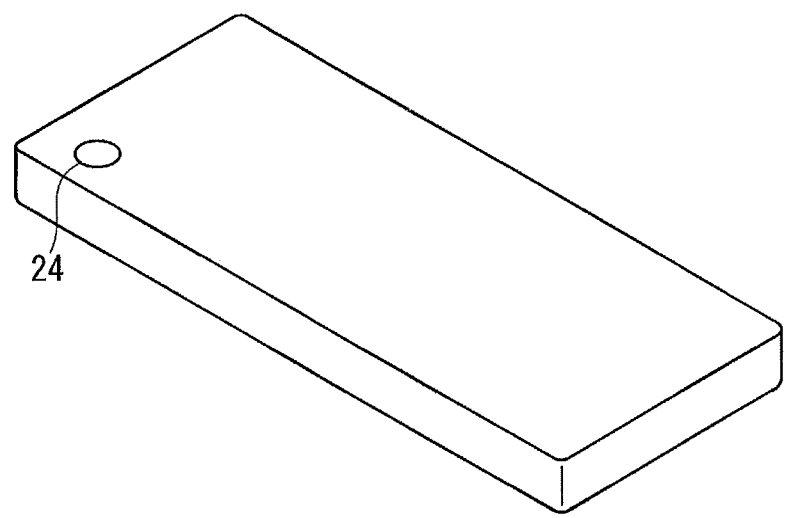

FIGS. 1A and 1B each illustrate the appearance of a mobile phone according to one embodiment. FIG. 1A illustrates one main surface of the mobile phone, and FIG. 1B illustrates the other main surface of the mobile phone. As illustrated in FIGS. 1A and 1B, the mobile phone 10 is a smartphone, and includes a flat longitudinal rectangular housing 12. It is noted in advance that the present disclosure is applicable to any mobile communication terminals including a tablet terminal, a tablet PC, a note PC, and a personal digital assistant (PDA) each having a touch panel.

A display 14, such as a liquid crystal display and an organic EL display, is disposed at the one main surface (front surface) of the housing 12. The display 14 is also referred to as a display device. A touch panel 16 is disposed on the display 14.

A speaker 18 is embedded in the housing 12 at one end of the main surface in a longitudinal direction of the housing 12, and a microphone 20 is embedded in the housing 12 at the other end of the main surface in the longitudinal direction.

As hard keys constituting an input operation means along with the touch panel 16, a call key 22a, an end key 22b, and a menu key 22c are disposed at the one main surface of the housing 12 in one embodiment.

A lens aperture 24 communicating with a camera unit 58 (see FIG. 2) is disposed at the other main surface (back surface) of the housing 12.

For example, a user can input phone numbers by performing a touch operation through the touch panel 16 on a dialpad displayed on the display 14, and can start voice calls by operating the call key 22a. The user can end voice calls by operating the end key 22b. The user can power on and off the mobile phone 10 by long-pressing the end key 22b.

When the menu key 22c is operated, a home screen is displayed on the display 14. By performing a touch operation through the touch panel 16 on an object and the like displayed on the display 14 in this state, the user can select the object, and determine the selection.

When a camera function is performed, a preview image (through image) corresponding to a field is displayed on the display 14. The user can capture an image by performing an image capturing operation with the other main surface at which the lens aperture 24 is disposed being directed towards any object.

The mobile phone 10 has not only a phone function and the camera function but also an email function, a browser function, and the like. In the following description, a GUI such as a key, an icon, and the like displayed on the display 14 are also collectively referred to as objects.

Figure 2:
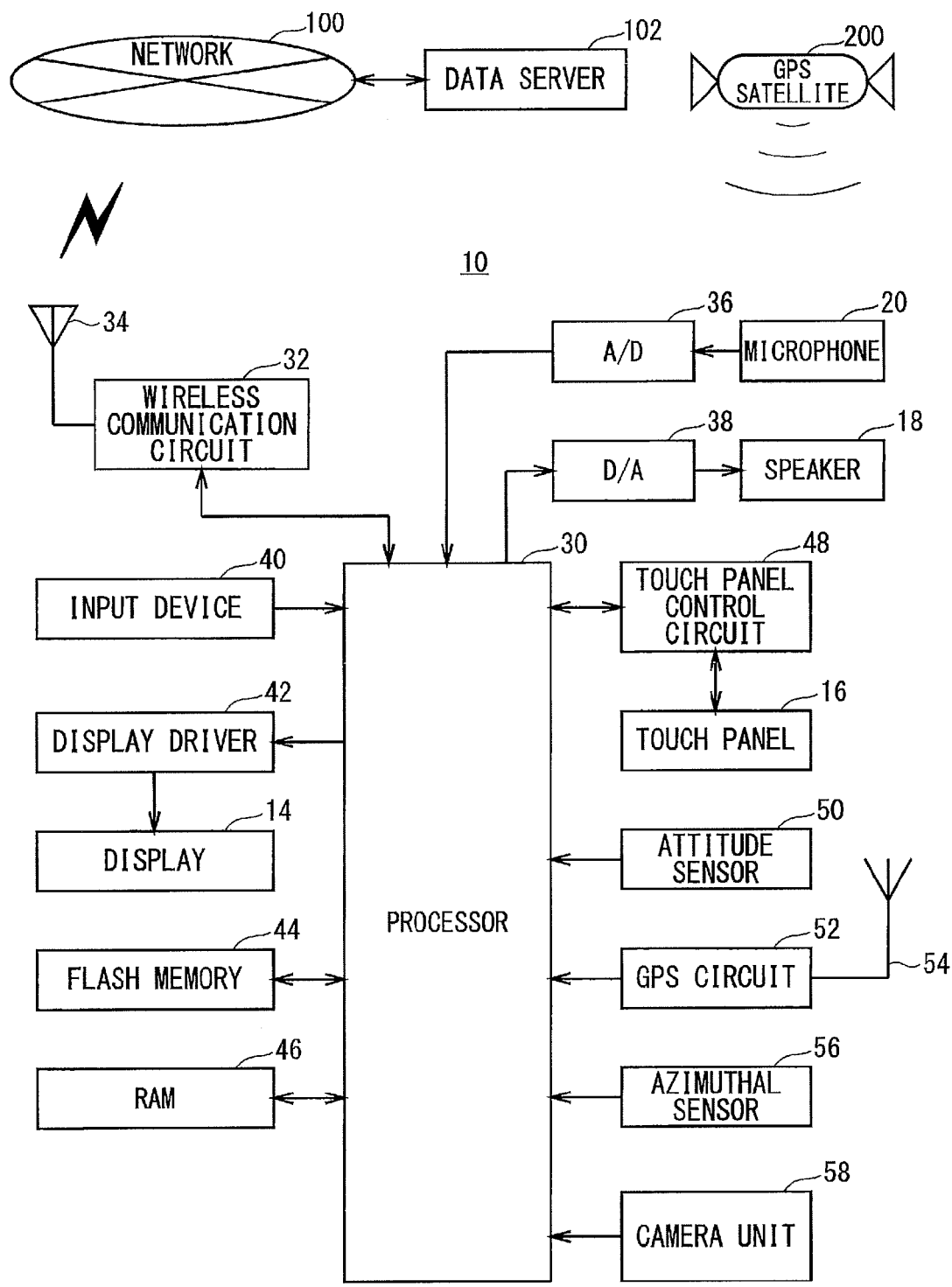
FIG. 2 illustrates electrical configuration of the mobile phone.

FIG. 2 illustrates electrical configuration of the mobile phone 10, and the mobile phone 10 includes a processor 30 referred to as a computer or a CPU. A wireless communication circuit 32, an A/D converter 36, a D/A converter 38, an input device 40, a display driver 42, flash memory 44, RAM 46, a touch panel control circuit 48, an attitude sensor 50, a GPS circuit 52, an azimuthal sensor 56, the camera unit 58, and the like are connected to the processor 30.

The processor 30 can control the mobile phone 10 as a whole. All or some programs preset in the flash memory 44 are developed on the RAM 46 in use, and the processor 30 can operate in accordance with the programs on the RAM 46. The RAM 46 is also used as a working area or a buffer area of the processor 30.

The input device 40 includes the hard keys 22 illustrated in FIG. 1A. The input device 40 thus forms an operation reception unit that can receive key operations on the hard keys 22 from the user. Information (key data) on the hard keys operated by the user is input to the processor 30.

The wireless communication circuit 32 is a circuit for transmitting and receiving radio waves for voice calls and emails through an antenna 34. In one embodiment, the wireless communication circuit 32 is a circuit for performing wireless communication in accordance with a Code Division Multiple Access (CDMA) system. For example, if the user provides directions to make a call (transmit voice) by operating the touch panel 16, the wireless communication circuit 32 can perform voice transmission processing and output voice transmission signals through the antenna 34 under the directions of the processor 30. The voice transmission signals are transmitted to a phone of a recipient through a base station and a communication network. When voice reception processing is performed in the phone of the recipient, a communicable state is established, and the processor 30 can perform call processing.

The wireless communication circuit 32 is wirelessly connected to a network (a communication network and a telephone network) 100 through the antenna 34. A data server 102 is connected to the network 100 by wire or wirelessly. The mobile phone 10 can thus download (acquire) data from the data server 102 through the network 100.

The microphone 20 illustrated in FIG. 1A is connected to the A/D converter 36. As described above, the A/D converter 36 can convert voice signals from the microphone 20 into digital voice data, and input the digital voice data into the processor 30. On the other hand, the speaker 18 is connected to the D/A converter 38. The D/A converter 38 can covert digital voice data into voice signals, and provide the voice signals to the speaker 18 through an amplifier. Voice based on the voice data is thus output from the speaker 18. When the call processing is being performed, voice collected by the microphone 20 is transmitted to the phone of the recipient, and voice collected by the phone of the recipient is output from the speaker 18.

The processor 30 can adjust the volume of voice output from the speaker 18 by controlling an amplification factor of the amplifier connected to the D/A converter 38 in response to a volume adjustment operation performed by the user, for example.

The display 14 illustrated in FIG. 1A is connected to the display driver 42. Videos or images are displayed on the display 14 in accordance with video data or image data output from the processor 30. The display driver 42 includes video memory for temporarily storing therein image data to be displayed, and data output from the processor 30 is stored in the video memory. The display driver 42 can display images on the display 14 in accordance with the contents of the video memory. This means that the display driver 42 can control display on the display 14 connected to the display driver 42 under the directions of the processor 30. A backlight is disposed on the display 14, and the display driver 42 can control brightness and turning-on and -off of the backlight in accordance with the directions of the processor 30.

The touch panel 16 illustrated in FIG. 1A is connected to the touch panel control circuit 48. The touch panel control circuit 48 can provide necessary voltage and the like to the touch panel 16, and input, into the processor 30, a touch start signal indicating the start of a touch of the user on the touch panel 16, an end signal indicating the end of the touch of the user, and coordinate data indicating a touch position of the touch of the user. The processor 30 can thus determine an object touched by the user based on the coordinate data.

In one embodiment, the touch panel 16 is a capacitive touch panel that can detect a change in capacitance caused between the surface of the touch panel 16 and an object such as a finger. The touch panel 16 can detect a touch of one or more fingers on the touch panel 16, for example. The touch panel 16 is thus also referred to as a pointing device. The touch panel control circuit 48 can detect a touch operation in a touch detectable range of the touch panel 16, and output coordinate data indicating the position of the touch operation to the processor 30. This means that the user performs a touch operation on the surface of the touch panel 16 to input the position, the direction, and the like of the operation into the mobile phone 10.

In one embodiment, the touch operation includes a tap operation, a long-tap operation, a flick operation, a slide operation, and the like.

The tap operation refers to an operation to touch the surface of the touch panel 16 with a finger and then release the finger from the surface of the touch panel 16 in a short time. The long-tap operation refers to an operation to touch the surface of the touch panel 16 with a finger for a predetermined time or more and then release the finger from the surface of the touch panel 16. The flick operation refers to an operation to touch the surface of the touch panel 16 with a finger and flick the surface of the touch panel 16 with the finger in any direction at a predetermined speed or more. The slide operation refers to an operation to move a finger on the surface of the touch panel 16 in any direction with the finger being in contact with the surface of the touch panel 16 and then release the finger from the surface of the touch panel 16.

The above-mentioned slide operation includes a slide operation to touch a display object displayed on the surface of the display 14 with a finger and move the display object, which is a so-called drag operation. An operation to release the finger from the surface of the touch panel 16 after the drag operation is referred to as a drop operation.

In the following description, the tap operation, the long-tap operation, the flick operation, the slide operation, the drag operation, and the drop operation may each be described by omitting a term "operation". The touch operation may be performed not only with a finger of the user but also with a stylus pen or the like.

The attitude sensor 50 functions as a detector, and can detect an attitude and movement of the mobile phone 10. For example, the attitude sensor 50 includes a gyro sensor that can detect rotation (angular velocities) of three axes (X-, Y-, and Z-axes) of the mobile phone 10 and an acceleration sensor that can detect accelerations along the three axes (X-, Y-, and Z-axes) of the mobile phone 10, and the gyro sensor and the acceleration sensor are integrally formed by micro electro mechanical systems (MEMS) technology. The attitude sensor 50 is thus also referred to as a six-axis motion sensor. The processor 30 can detect an attitude (a tilt) and movement of the mobile phone 10 based on the angular velocities of the three axes and the accelerations along the three axes output from the attitude sensor 50. In other embodiments, the acceleration sensor and the gyro sensor may separately be provided in place of the attitude sensor 50.

The GPS circuit 52 is activated when the current position is located. The GPS circuit 52 can receive a GPS signal transmitted from a GPS satellite 200 through a GPS antenna 54. Upon receiving a GPS signal, the GPS circuit 52 can perform location processing based on the GPS signal. As a result, the latitude, the longitude, and the altitude (height) are calculated as GPS information (positional information). Although a single GPS satellite 200 is illustrated in FIG. 2 for simplicity, it is desirable to receive GPS signals from four or more GPS satellites 200 to locate the current position in three dimensions. Even if GPS signals cannot be received from four or more GPS satellites, however, the longitude and the latitude can be calculated through two-dimensional location as long as GPS signals can be received from three GPS satellites 200. The GPS circuit 52 and the GPS antenna 54 are also referred to as a location unit.

A database of map data and a database of facility information are herein stored in the data server 102. The mobile phone 10 can download (acquire) the map data and the facility information from the database in the data server 102 based on the GPS information (positional information) calculated by the GPS circuit 52. In this case, a map including facility information on surrounding facilities is displayed on the display 14 based on the downloaded map data and facility information.

The azimuthal sensor 56 is also referred to as an electronic compass or a direction output unit, and includes three geomagnetic sensors and a control circuit. The control circuit can extract geomagnetic data from magnetic data detected by the three geomagnetic sensors, and output the geomagnetic data to the processor 30. The processor 30 can calculate an azimuthal angle (an azimuth or a direction) based on the geomagnetic data output from the control circuit, and store the azimuthal angle in a buffer of the RAM 46 as the direction of a terminal. The calculated azimuthal angle corresponds to an optical axis along which an image sensor and a lens of the camera unit 58 are arranged. Each of the geomagnetic sensors includes a Hall element, but may include a magnet-resistive (MR) element and a magnet-impedance (MI) element. The azimuthal sensor 56 is also referred to as the detector as it can detect movement of the mobile phone 10.

The camera unit 58 includes a control circuit, the lens, the image sensor, and the like. When an operation to perform the camera function is performed, the processor 30 can activate the control circuit and the image sensor. When image data based on a signal output from the image sensor is input into the processor 30, a preview image corresponding to a field is displayed on the display 14. When image capturing processing is performed in this state, a date and time of an image capturing operation is acquired, and metadata corresponding to the image data is created. The metadata includes information on a data name, a date and time of image capturing, and the like. The processor 30 can associate the image data acquired through image capturing with the metadata, and store the image data and the metadata in the flash memory 44 as a single image file. In this case, the processor 30 can output sound indicating that the image capturing processing is being performed from the speaker 18. The state of the camera unit 58 outputting a captured image is referred to as an active state, and the state of the camera unit 58 not outputting the captured image to reduce power consumption is referred to as a standby state.

Figure 3:
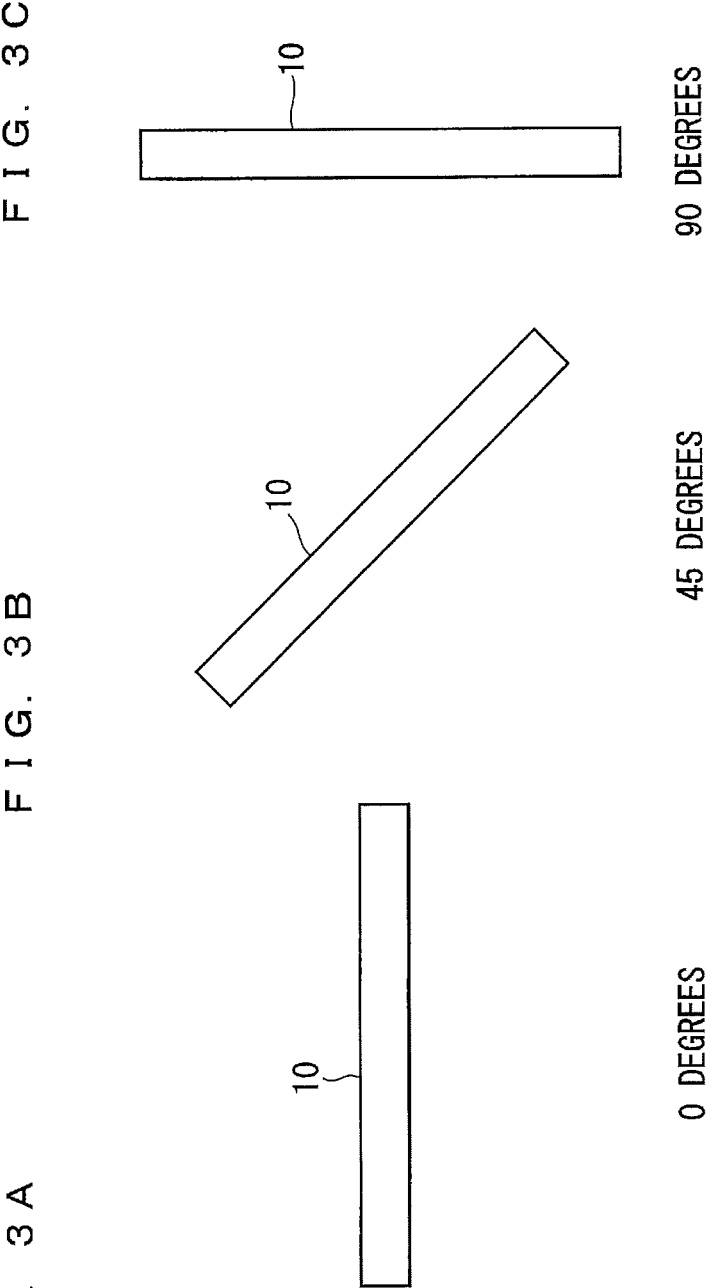
FIGS. 3A, 3B, and 3C illustrate examples of the attitude of the mobile phone.

FIGS. 3A, 3B, and 3C illustrate examples of the attitude of the mobile phone illustrated in FIGS. 1A and 1B. FIG. 3A illustrates an example of a horizontal state of the mobile phone with respect to the ground, FIG. 3B illustrates an example of a tilt state of the mobile phone with respect to the ground, and FIG. 3C illustrates an example of a vertical state of the mobile phone with respect to the ground.

When the mobile phone 10 is rotated, the attitude of the mobile phone 10 in relation to output of the attitude sensor 50 is as follows. That is to say, in the attitude illustrated in FIG. 3A, output of the attitude sensor 50 is 0 degrees, and a display surface of the display 14 is in a horizontal state with respect to the ground. In the attitude illustrated in FIG. 3B, output of the attitude sensor 50 is 45 degrees, and the display surface of the display 14 is tilted with respect to the ground. In the attitude illustrated in FIG. 3C, output of the attitude sensor 50 is 90 degrees, and the display surface of the display 14 is in a vertical state with respect to the ground. In one embodiment, the state illustrated in FIG. 3A is referred to as the horizontal state, and the state illustrated in FIG. 3C is referred to as the vertical state. When output of the attitude sensor 50 is in a range of 315 degrees to 359 degrees, 0 degrees to 45 degrees, and 135 degrees to 225 degrees, the mobile phone 10 is detected to be in the horizontal state. On the other hand, when output of the attitude sensor 50 is in a range of 46 degrees to 134 degrees and 226 degrees to 314 degrees, the mobile phone 10 is detected to be in the vertical state.

Figure 4:
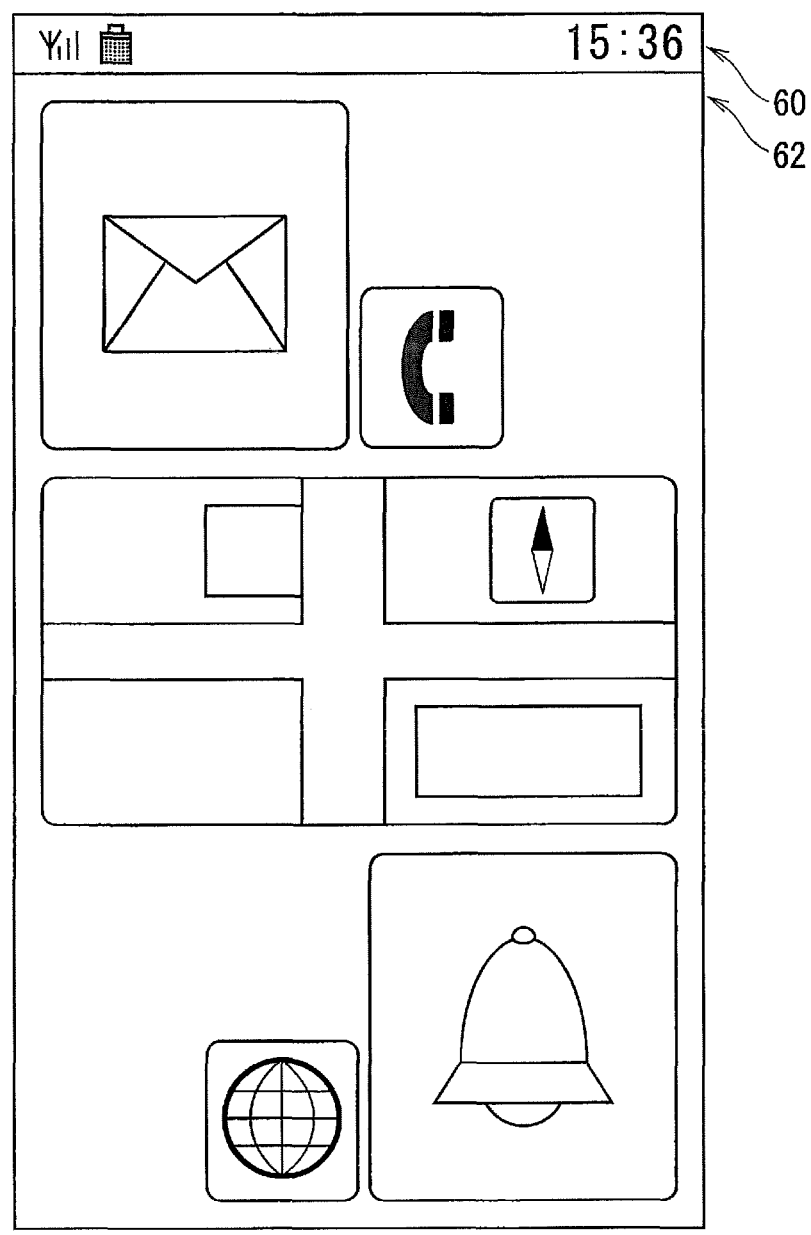
FIG. 4 illustrates an example of the state of displaying a home screen on a display.

FIG. 4 illustrates an example of the home screen displayed on the display 14. A display range of the display 14 includes a state display area 60 and a function display area 62. In the state display area 60, a pictogram indicating a radio wave reception state of the antenna 34, a pictogram indicating the amount of power remaining in a secondary battery, and time are displayed. In the function display area 62, a home screen including tiled objects (hereinafter, simply referred to as tiles) for performing functions is displayed.

The tiles are shortcuts for the functions, and the user can perform the functions corresponding to the tiles by tapping the tiles. Display states, namely the display positions and the display sizes, of the tiles can be changed to any display states. The user can further add a tile corresponding to any function to the home screen. The functions in one embodiment include an application installed in the mobile phone 10 as well as a function to change settings of the mobile phone 10.

In the home screen of FIG. 4, an email tile corresponding to the email function, a phone tile corresponding to the phone function, a map tile corresponding to a map function, a browser tile corresponding to the browser function, and an alarm tile corresponding to an alarm function are displayed.

When the long-tap operation is performed on a tile, the tile becomes editable. In this state, the display size and the display position of the tile can be changed, and the tile can be deleted. Even if the tile is deleted, a corresponding function (application) is not uninstalled.

When a function operates in the background, live information is displayed in a display range of a tile corresponding to the function. The live information includes a preview image. In the case of the email tile, for example, a subject of an incoming email is displayed in the email tile as the live information along with a number icon.

FIGS. 5A and 5B illustrate an example of an operation to scroll the home screen illustrated in FIG. 4. FIG. 5A illustrates an example of the slide operation performed on the home screen, and FIG. 5B illustrates an example of the home screen having been scrolled in accordance with the slide operation. The slide operation performed on the home screen is described below with reference to FIGS. 5A and 5B.

The user can display other tiles in the home screen by scrolling the home screen vertically. For example, when a slide operation Ts is performed upwards, the home screen is scrolled upwards. When the home screen is scrolled upwards, the email tile, the phone tile, and the map tile are hidden, and an augmented reality (AR) tile corresponding to an AR function using the camera unit 58 (FIG. 2), a schedule tile corresponding to a schedule function, and a camera tile corresponding to the camera function are displayed.

In one embodiment, the map function and the AR function are also respectively referred to as a first navigation function and a second navigation function, and the two functions are also collectively referred to as a navigation function. The map tile and the AR tile are also respectively referred to as a first navigation tile (first object) and a second navigation tile (second object).

Figure 6:
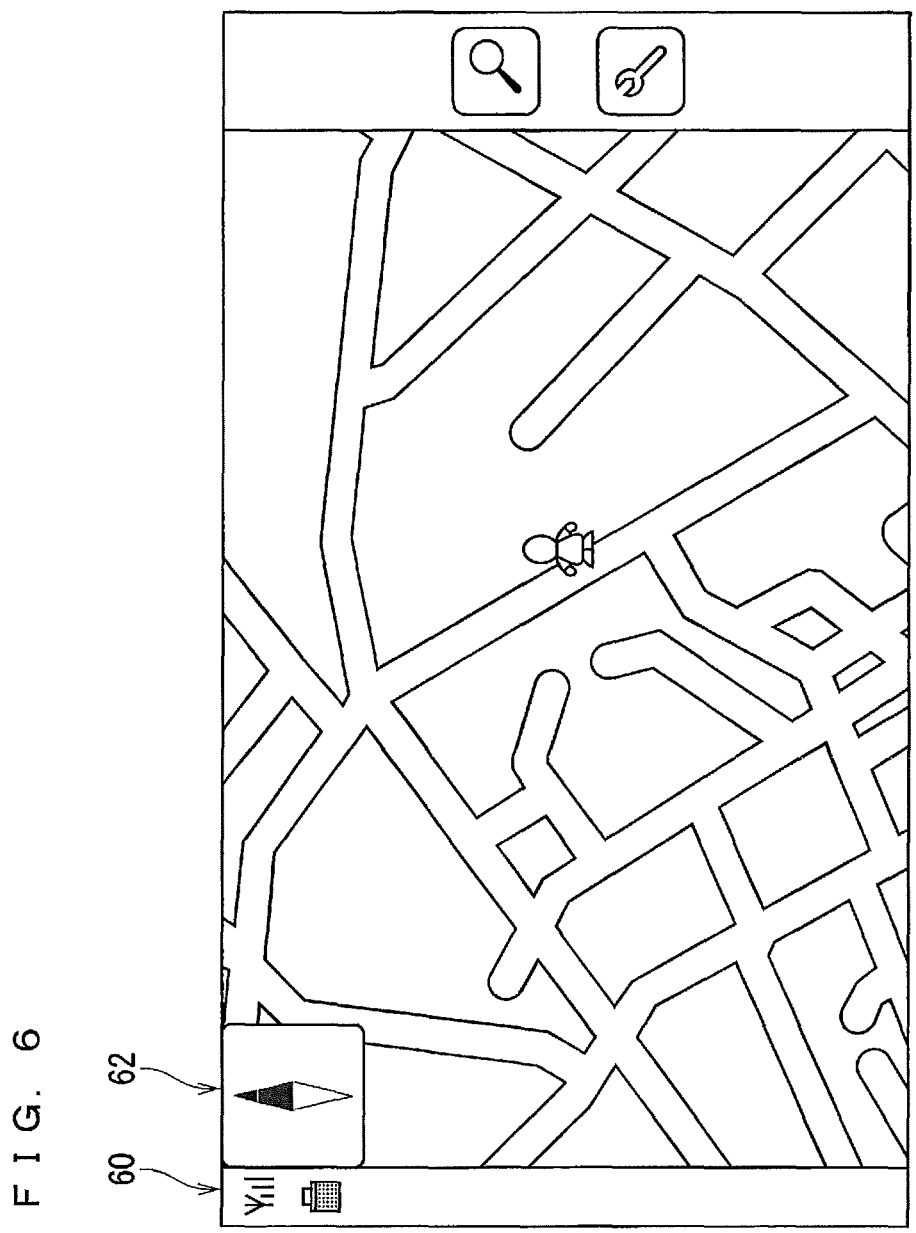
FIG. 6 illustrates the state of displaying an example of a screen of a first navigation function on the display.

FIG. 6 illustrates a screen of the map function displayed on the display 14 (FIG. 1A). When the user performs the tap operation on the map tile, the map function is performed. When the map function is performed, the current position is located, and, based on the located current position, map data indicating the current position is acquired from the database in the data server 102 (FIG. 2). On the display 14 of the mobile phone 10, a map is displayed based on the acquired map data, and a current position icon indicating the current position is displayed. When the slide operation is performed on the map, for example, the displayed map changes following the slide operation. When a slide operation (hereinafter, referred to as a pinch-out operation) to touch two positions simultaneously and then move the two positions away from each other is performed, the map is enlarged. On the other hand, when a slide operation (hereinafter, referred to as a pinch-in operation) to touch two position simultaneously and then move the two positions towards each other is performed, the map is reduced.

A map icon indicating the azimuth of the map is displayed in an upper left portion of the screen of the map function, and a search key (key represented by a picture of a magnifying glass) and a function key (key represented by a picture of a wrench) are displayed in a right portion of the screen of the map function.

The search key is a key to search for facility information on surrounding facilities. When the tap operation is performed on the search key, a search menu is displayed. The user can display any facility information by designating any category using the search menu.

Figure 7:
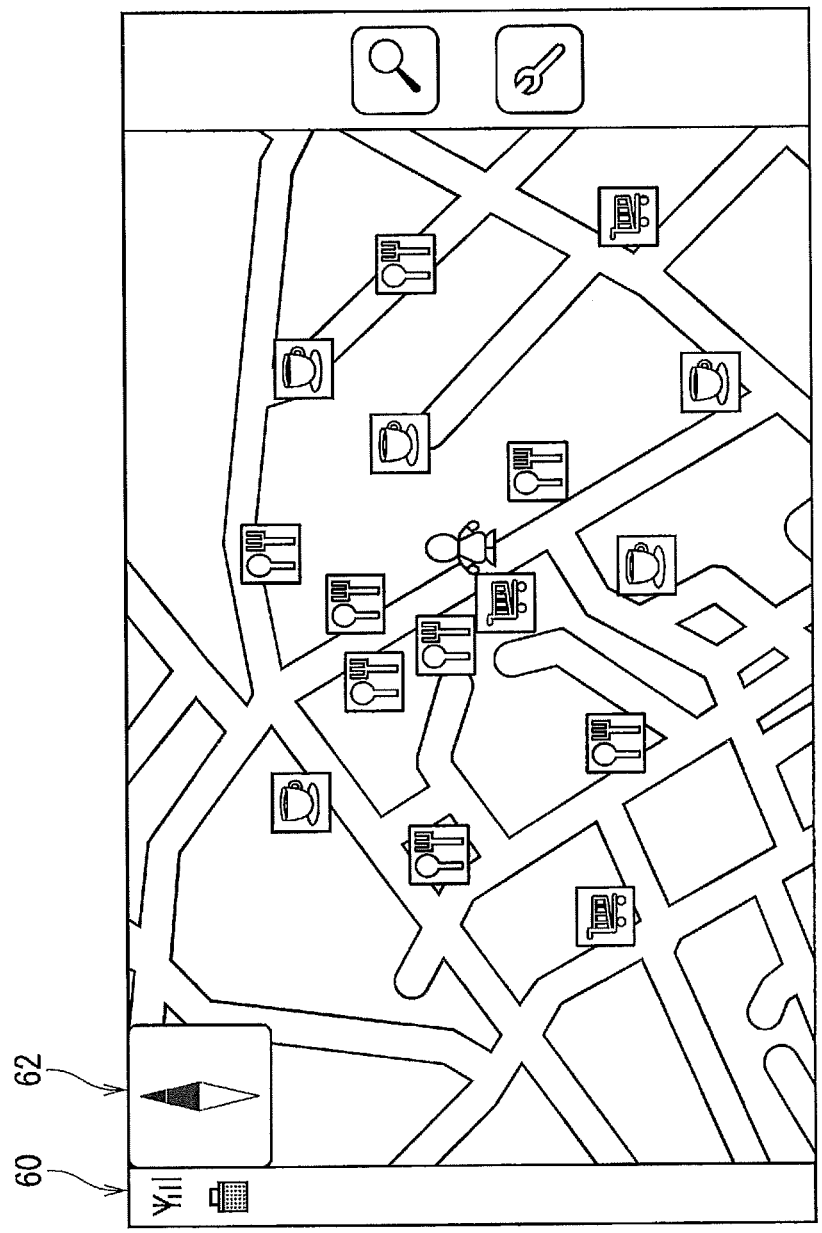
FIG. 7 illustrates the state of displaying another example of the screen of the first navigation function on the display.

FIG. 7 illustrates another screen of the map function displayed on the display 14 (FIG. 1A). When the user performs the tap operation on the search key, and designates "restaurants, supermarkets, and cafes" as a category of the facility information in the search menu, facility information on surrounding facilities included in the designated category is acquired from the database in the data server 102 (FIG. 2). The facility information includes information on names, categories, positions, reviews, and the like of the facilities. In the map function, as illustrated in FIG. 7, facility information indicating categories is added to the displayed map based on the positional information included in the acquired facility information. As described above, the user can check the current position, and know the positions of facilities located around the user by using the map function.

The function key is a key to change settings of the map function. When the tap operation is performed on the function key, a function menu is displayed. In the function menu, the map function can be set to be performed in the background, for example.

Figure 8A:
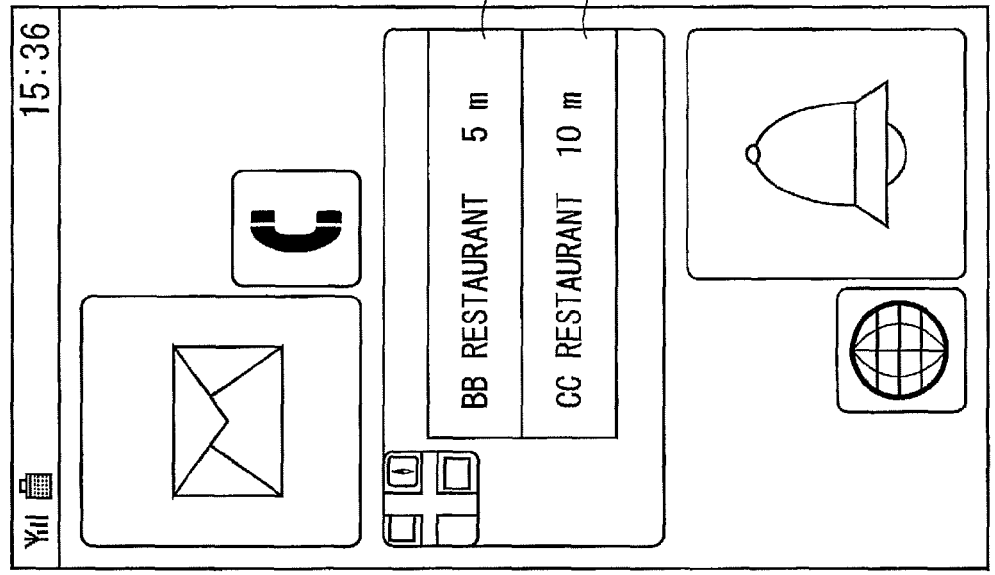
FIGS. 8A and 8B illustrate examples of the state of displaying facility information in a first navigation tile.
Figure 8B:
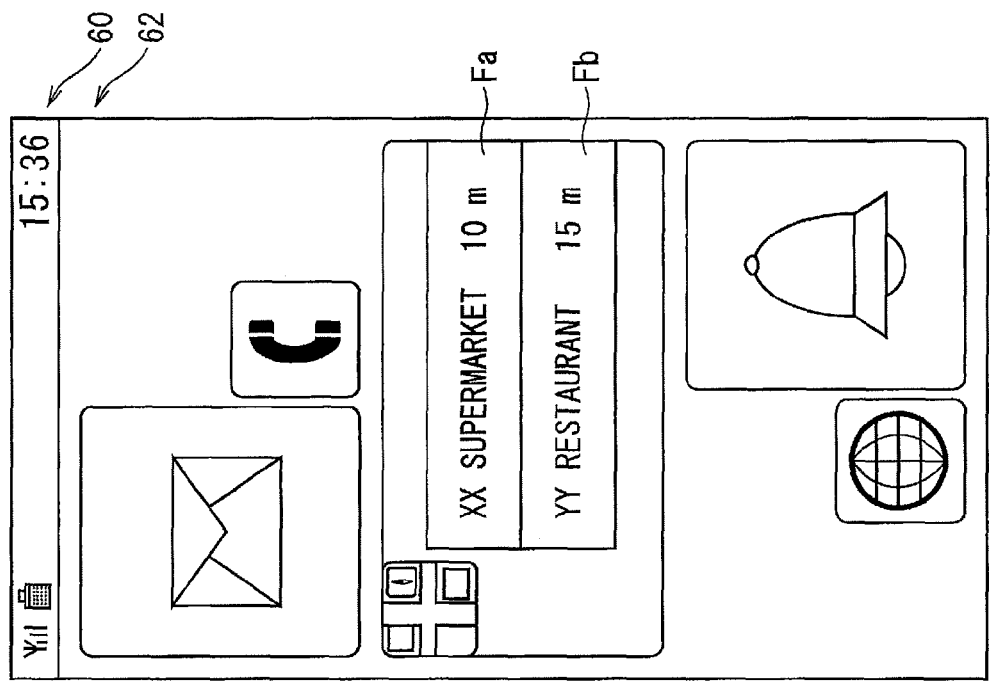

FIGS. 8A and 8B illustrate examples of the state of displaying the facility information in the map tile illustrated in FIG. 5A. FIG. 8A illustrates an example of the state of displaying the facility information acquired at a certain position in the map tile, and FIG. 8B illustrates an example of the state of displaying the facility information acquired at another position in the map tile.

As illustrated in FIGS. 8A and 8B, when the map function is performed in the background, for example, the current position and the facility information on surrounding facilities are acquired in the map function. When the map tile is displayed in the home screen, facility information F on facilities close to the current position is displayed in the map tile as the live information. In one embodiment, facility information F on the closest facility to the current position and the second closest facility to the current position is displayed, for example. The facility information F includes names of the facilities and distances of the facilities from the current position. Thus, as illustrated in FIG. 8A, facility information Fa "XX SUPERMARKET 10 m" on the closest facility to the user and facility information Fb "YY RESTAURANT 15 m" on the second closest facility to the user are displayed in the map tile.

When the facility information is displayed, the current position is located at predetermined time (e.g., one second) intervals, and the facility information F displayed in the map tile is updated at predetermined time intervals. This means that, if the user having the mobile phone 10 moves, and the distances between the mobile phone 10 and surrounding facilities change, the change is reflected in the facility information F displayed in a functional tile. Thus, as illustrated in FIG. 8B, facility information Fa "BB RESTAURANT 5 m" and facility information Fb "CC RESTAURANT 10 m" are displayed when the user moves.

Figure 9:
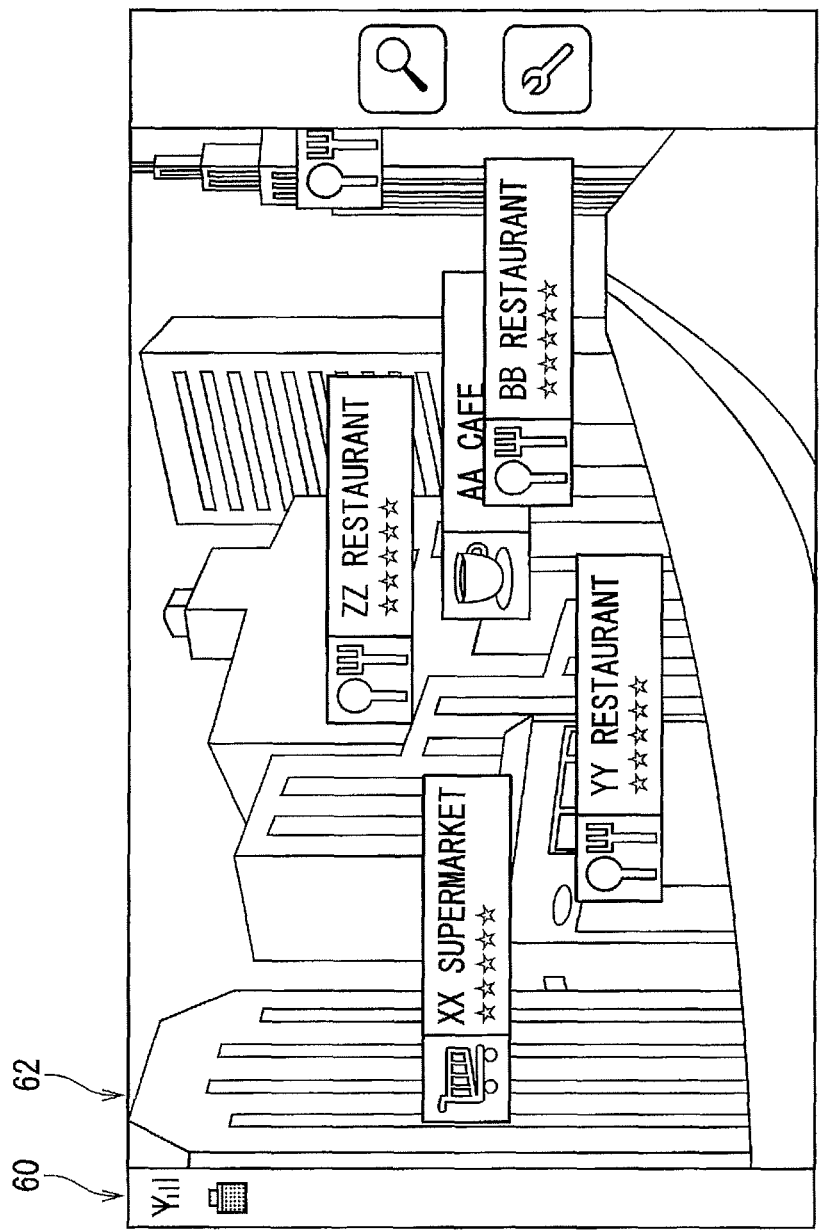
FIG. 9 illustrates the state of displaying an example of a screen of a second navigation function on the display.

FIG. 9 illustrates a screen of the AR function displayed on the display 14 (FIG. 1A). When the user performs the tap operation on the AR tile, the AR function is performed. When the AR function is performed, the camera unit 58 (FIG. 2) is set to the active state, and outputs a captured image. The current position is located, and the facility information on surrounding facilities is acquired from the database in the data server 102 (FIG. 2). Facility information on facilities to which the lens of the camera unit 58 is directed is extracted from the acquired facility information, and a preview image on which the extracted facility information has been superimposed is displayed on the display 14. In the screen of the AR function, the facility information indicates names, categories, and reviews of the facilities. When the user changes the direction of the mobile phone 10, i.e., the direction of the lens of the camera unit 58, the facility information is extracted again in accordance with the direction of the lens after the change, and a preview image on which the facility information extracted again has been superimposed is displayed. This allows the user to know specific positions of the surrounding facilities.

The search key and the function key are displayed in a right portion of the screen of the AR function as with the map function. When the tap operation is performed on the search key, the search menu is displayed so that the user can designate a category of the facility information to be displayed. When the tap operation is performed on a setting key, the function menu is displayed. The user can set the AR function so that the AR function is performed in the background using the function menu.

FIG. 10 illustrates the state of setting the AR function so that the AR function is performed in the background. When the AR tile is displayed in the home screen, facility information Fc and facility information Fd on surrounding facilities are displayed in the AR tile as in the map tile. The facility information F displayed in the AR tile is updated at predetermined time intervals as with the facility information displayed in the map tile.

As described above, in one embodiment, the user can properly know surrounding facilities in the home screen. In particular, since the facility information F is updated at predetermined time intervals, the user can properly know surrounding facilities even if the user moves in any direction.

In one embodiment, when the tap operation is performed on a functional tile corresponding to a navigation function in a state in which the navigation function is performed in the background, a screen of the navigation function is displayed on the display 14. When the navigation function is performed as described above, the user can switch between the map function and the AR function.

Figure 11A:
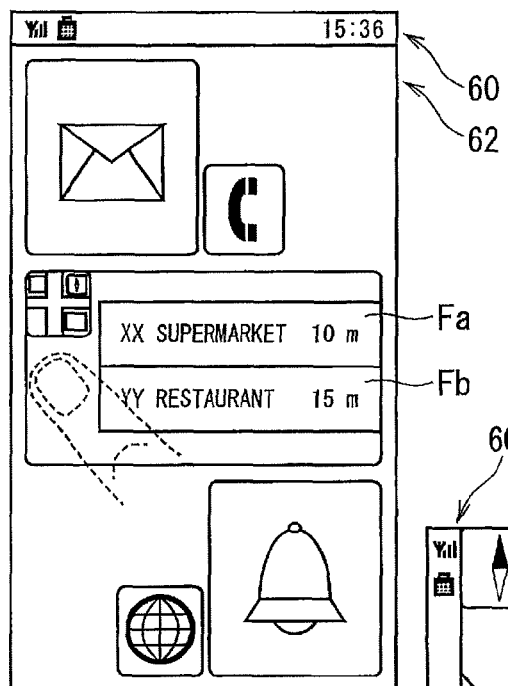
FIGS. 11A, 11B, and 11C illustrate an example of an operation to display a screen of a navigation function performed in the background.
Figure 11B:
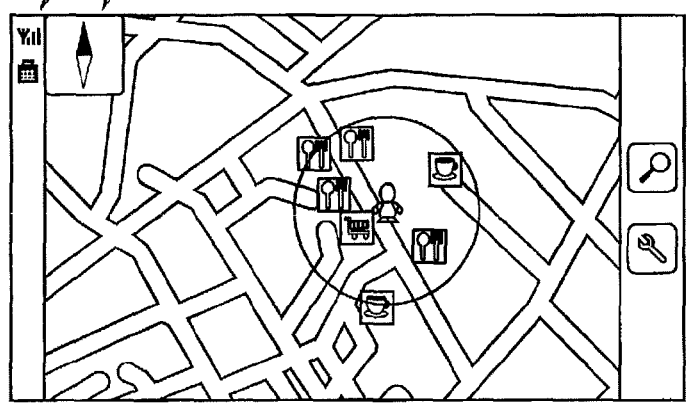
Figure 11C:
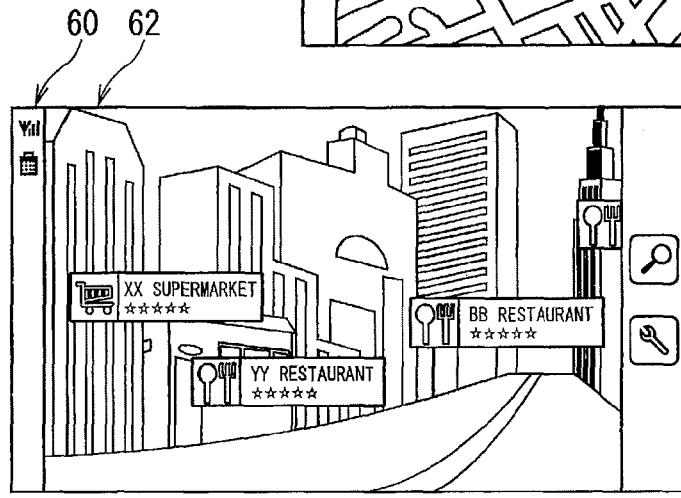

FIGS. 11A, 11B, and 11C illustrate an example of an operation to display the screen of the navigation function performed in the background. FIG. 11A illustrates an example of the state of performing the touch operation on the map tile, FIG. 11B illustrates an example of the screen of the map function displayed when the touch operation illustrated in FIG. 11A is performed, and FIG. 11C illustrates an example of the screen of the AR function displayed when a switching operation is performed.

As illustrated in FIG. 11A, when the map tile is selected through the tap operation in a state in which the map function is performed in the background, the screen of the map function is displayed on the display 14. When the screen of the map function is displayed, the current position icon, a circle indicating a predetermined distance (e.g., 100 m) from the current position, and facility information on facilities included in the circle are displayed as illustrated in FIG. 11B. In a case where the AR function is not performed in the background when the tap operation is performed on the map tile, the camera unit 58 is set to the standby state.

When the mobile phone 10 is moved to be in the vertical state in a state in which the screen of the map function is displayed, the screen of the AR function is displayed on the display 14 as illustrated in FIG. 11C. In this case, facility information on facilities to which the lens of the camera unit 58 is directed is extracted from facility information on facilities located within a predetermined distance from the user, and a preview image on which the extracted facility information has been superimposed is displayed on the display 14. In a case where the AR function is not performed in the background when the mobile phone 10 is set to the vertical state, the AR function is performed.

When the mobile phone 10 is moved to be in the horizontal state in a state in which the screen of the AR function is displayed, the screen of the map function is displayed. This means that the user can switch between the screen of the map function and the screen of the AR function by performing the switching operation to tilt the mobile phone 10. As a result, the user can display the screen of the map function when the user wants to check the surroundings to search for a target facility, and display the screen of the AR function when the user wants to check a specific position of the facility. The user can easily discover the target facility as switching between the screens of the two functions can easily be performed only by changing the attitude of the mobile phone 10.

Figure 12A:
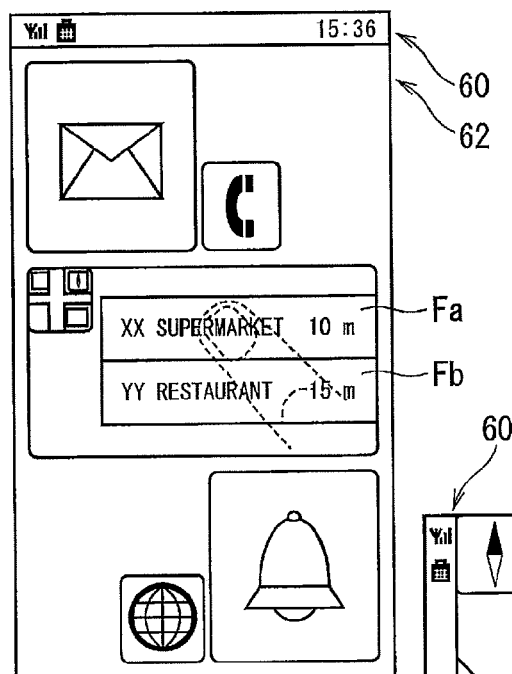
FIGS. 12A, 12B, and 12C illustrate another example of the operation to display the screen of the navigation function performed in the background.
Figure 12B:
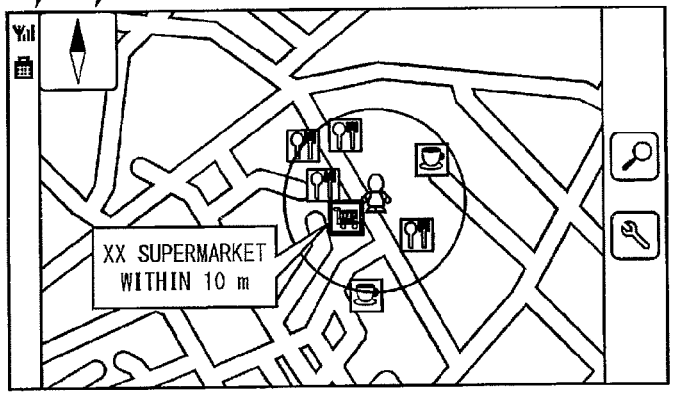
Figure 12C:
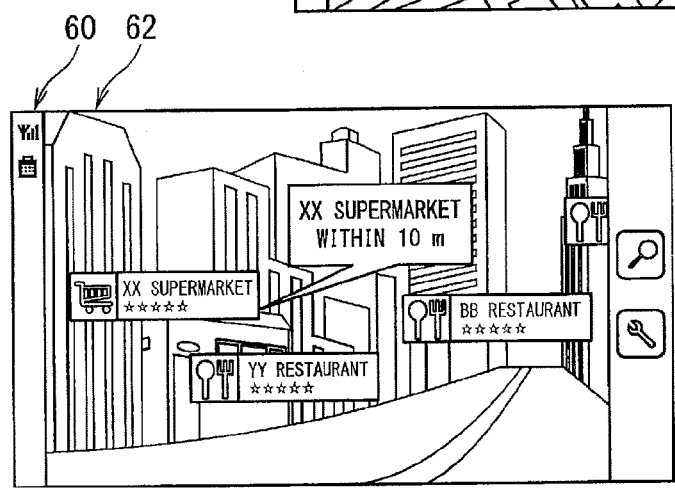

FIGS. 12A, 12B, and 12C illustrate another example of the operation to display the screen of the navigation function performed in the background. FIG. 12A illustrates an example of the state of performing the touch operation on the facility information, FIG. 12B illustrates an example of the screen of the map function displayed when the touch operation illustrated in FIG. 12A is performed, and FIG. 12C illustrates another example of the screen of the AR function displayed when the switching operation is performed.

As illustrated in FIG. 12A, when the facility information F displayed in a functional tile corresponding to a navigation function is selected through the tap operation, the screen of the navigation function is displayed, and the selected facility information is highlighted. For example, when the tap operation is performed on the facility information Fa "XX SUPERMARKET" displayed in the map tile, the screen of the map function is displayed, and a pop-up window is provided to the facility information "XX SUPERMARKET" in a map.

When the screen is switched to the screen of the AR function in a state in which the selected facility information is highlighted, the facility information is highlighted as in the screen of the map function if the selected facility information can be displayed. Detailed description on switching between the screen of the map function and the screen of the AR function is omitted as it is the same as description made above.

As described above, in one embodiment, the user can easily determine whether to check the surroundings without determining the target facility or to check the status of the target facility after determining the target facility when the navigation function is performed in the background.

Figure 13:
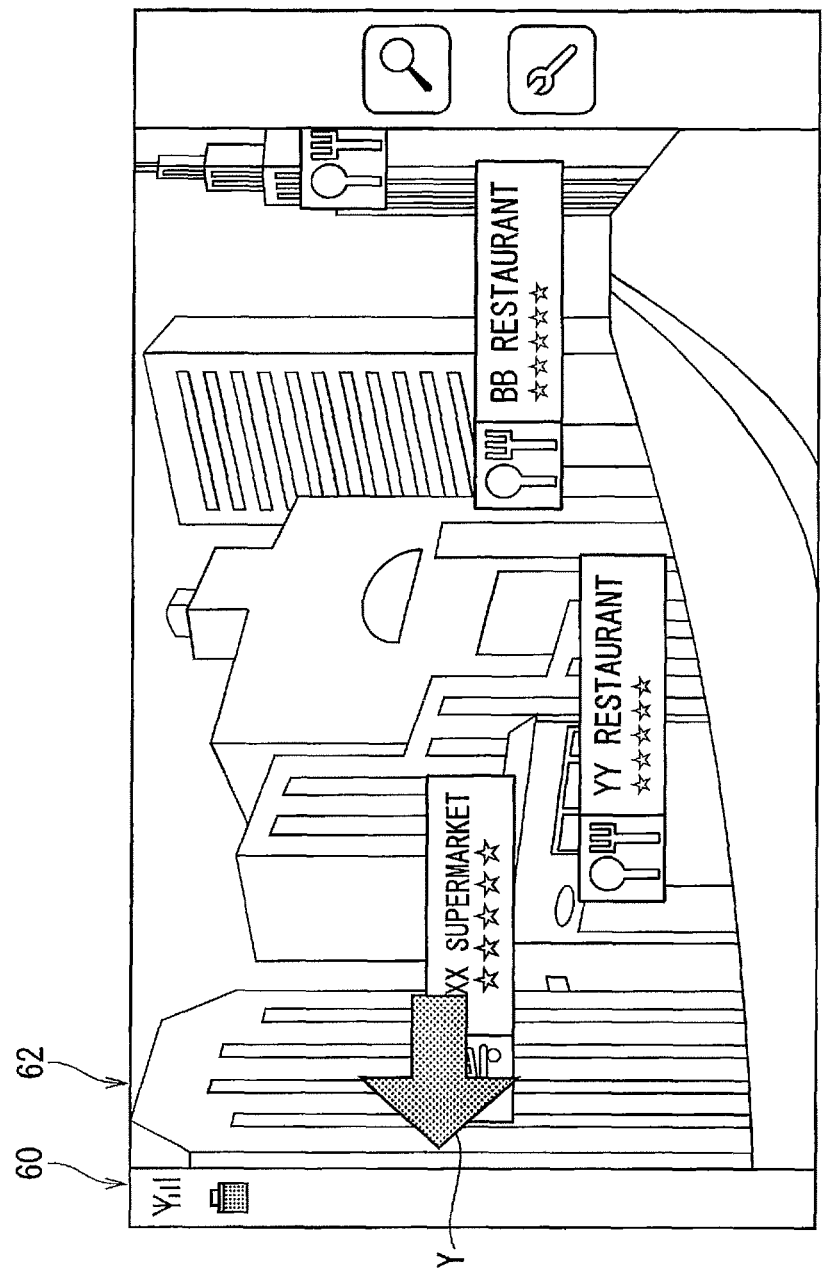
FIG. 13 illustrates an example of the state of displaying a guide icon in the screen of the second navigation function.

FIG. 13 illustrates an example of the state of displaying a guide icon in the screen of the AR function illustrated in FIG. 12C.

As illustrated in FIG. 13, if the selected facility information cannot be displayed when the screen of the AR function is displayed, a guide icon Y indicating the position of the selected facility information is displayed in the screen of the AR function. For example, the guide icon Y illustrated in FIG. 13 points to the left, so that the user can display the selected facility information in the screen of the AR function by moving the mobile phone 10 to the left.

Figure 14A:
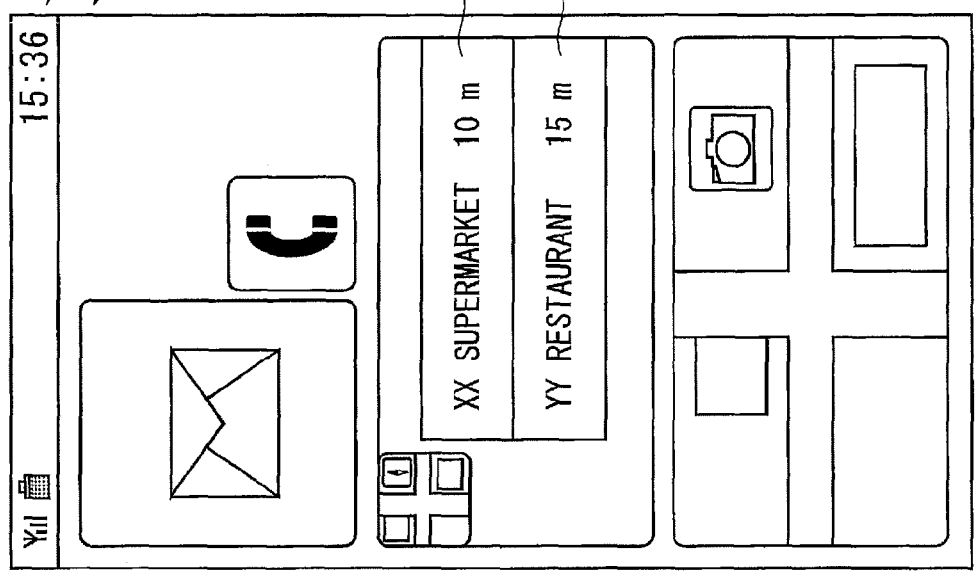
FIGS. 14A and 14B illustrate other examples of the state of displaying the home screen on the display.
Figure 14B:
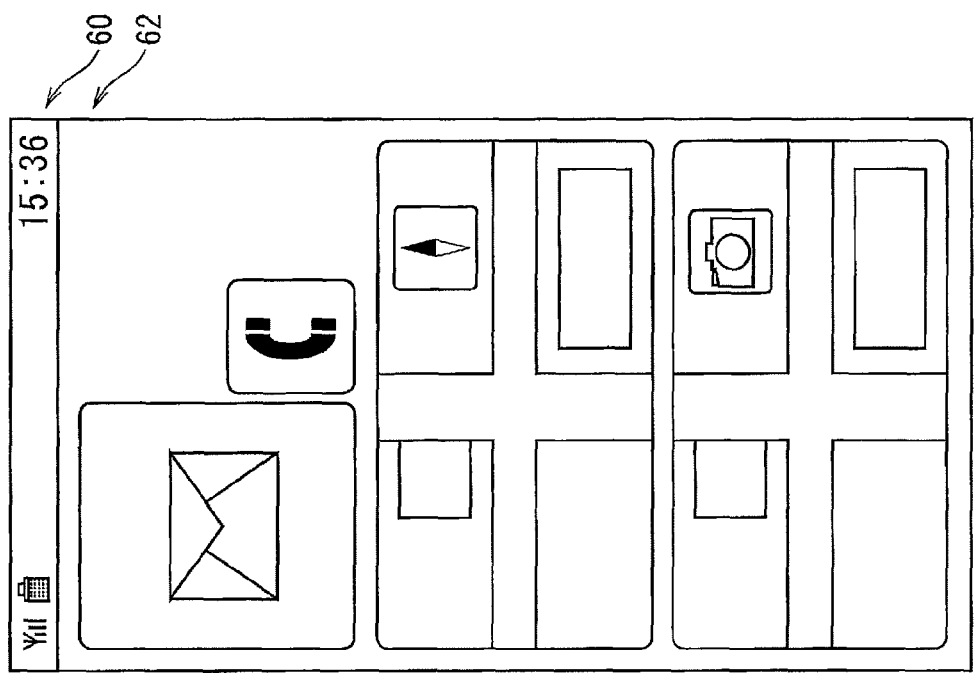

FIGS. 14A and 14B illustrate other examples of the state of displaying the home screen on the display 14 (FIG. 1A). FIG. 14A illustrates an example of the state of displaying the map tile and the AR tile at one time, and FIG. 14B illustrates an example of the state of displaying the facility information in the map tile illustrated in FIG. 14A.

As illustrated in FIGS. 14A and 14B, the map tile and the AR tile may be displayed next to each other in other embodiments. Only one of the map function and the AR function may be set to be performed in the background. For example, the user can set only one of the two navigation functions that is mainly used so that the navigation function is performed in the background. This can avoid the same facility information being displayed in each of the functional tiles. In addition, power consumption of the mobile phone 10 can be reduced as the number of functional tiles in which the facility information is displayed is limited to one. In particular, the user can provide settings on whether to perform each of the navigation functions in the background. The user can thus determine whether to perform the navigation function in the background based on the amount of remaining battery power of the mobile phone 10 and the like.

When the tap operation is performed on a functional tile corresponding to a navigation function not performed in the background, one navigation function is performed regardless of the other navigation function. For example, as illustrated in FIG. 14B, when the AR function is performed in a state in which the map function is performed in the background, the facility information is acquired from the data server 102 (FIG. 2) in the AR function, and the acquired facility information is displayed in the screen of the AR function regardless of the facility information F displayed in the map function.

The user may set the facility information displayed in the map tile so that the facility information F of a particular category is displayed. In other embodiments, the facility information may be set so that a genre of the facility information F displayed in the functional tile differs between the map function and the AR function.

Although switching between the screen of the map function and the screen of the AR function has been described to be performed after the touch operation is performed on the map tile with reference to FIG. 11A and FIG. 12A, switching between the screen of the AR function and the screen of the map function can be performed after the touch operation is performed on the AR tile.

Features of one embodiment have been briefly described above. One embodiment is described in detail below with use of a memory map illustrated in FIG. 15 and flow charts illustrated in FIGS. 16 to 20.

Figure 15:
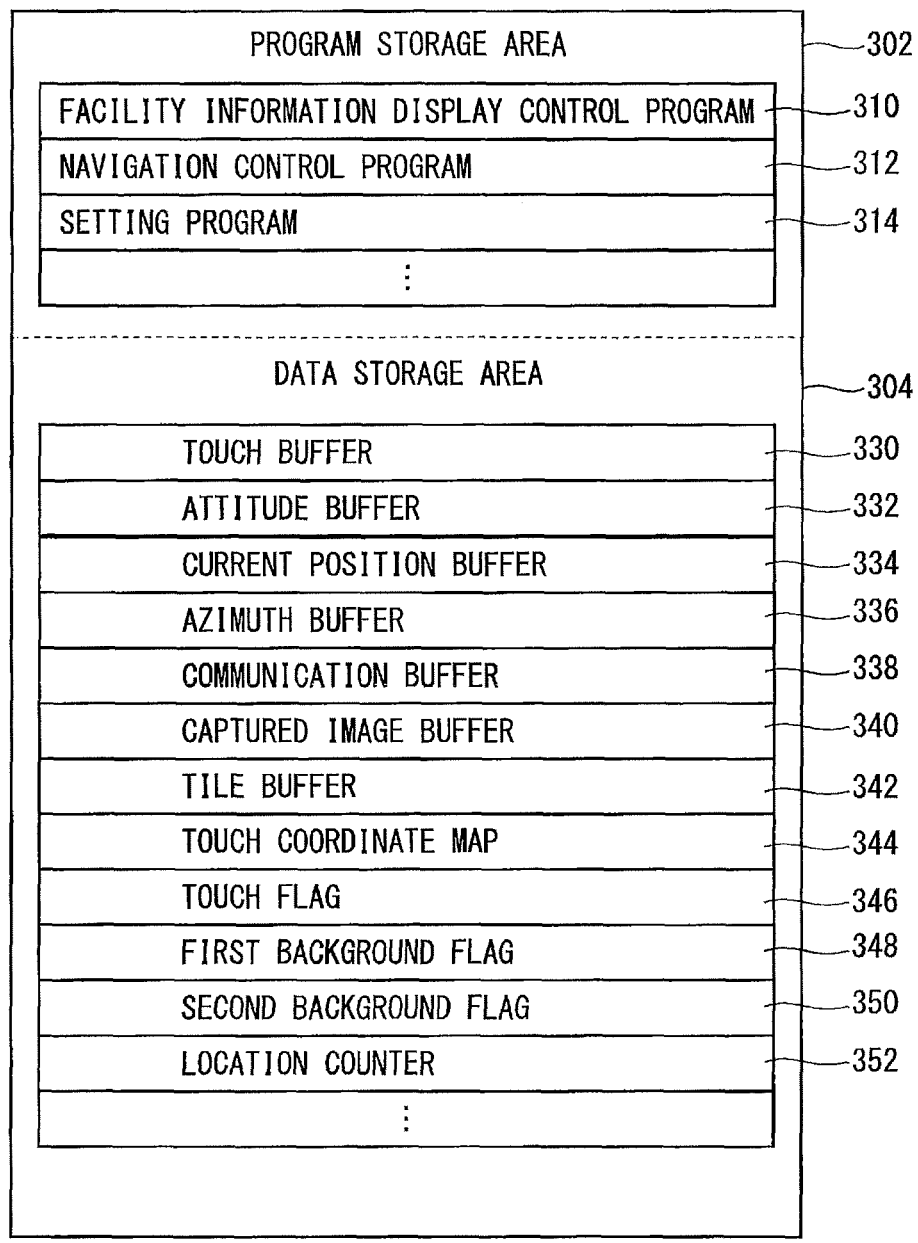
FIG. 15 illustrates an example of a memory map of RAM.

FIG. 15 illustrates an example of the memory map of the RAM illustrated in FIG. 2. As illustrated in FIG. 15, a program storage area 302 and a data storage area 304 are formed in the RAM 46. The program storage area 302 is an area for reading and storing (developing) part or all of program data preset in the flash memory 44 (FIG. 2) as described above.

In the program storage area 302, a facility information display control program 310 for controlling facility information displayed in a functional tile, a navigation control program 312 for controlling switching between two navigation functions, a setting program 314 for setting the navigation functions so that the navigation functions are performed in the background, and the like are stored.

Programs for performing functions such as the email function and the browser function are stored in the program storage area 302.

In the data storage area 304 of the RAM 46, a touch buffer 330, an attitude buffer 332, a current position buffer 334, an azimuth buffer 336, a communication buffer 338, a captured image buffer 340, a tile buffer 342, and the like are provided, and a touch coordinate map 344 and the like are stored. A touch flag 346, a first background flag 348, a second background flag 350, a location counter 352, and the like are also provided in the data storage area 304.

Data on touch coordinates output from the touch panel control circuit 48 (FIG. 2) is stored in the touch buffer 330. Data on accelerations and angular velocities output from the attitude sensor 50 (FIG. 2) is temporarily stored in the attitude buffer 332. Data on the current position located by the GPS circuit 52 (FIG. 2) is temporarily stored in the current position buffer 334. Data on an azimuthal angle output from the azimuthal sensor 56 (FIG. 2) is temporarily stored in the azimuth buffer 336. Data acquired (downloaded) through data communication with the data server 102 (FIG. 2) is temporarily stored in the communication buffer 338. A captured image output from the camera unit 58 (FIG. 2) is temporarily stored in the captured image buffer 340. The preview image is displayed based on the captured image stored in the captured image buffer 340. The tile buffer 342 is a buffer for temporarily storing therein an image of a tile, the live information (facility information F), and the like displayed in the home screen.

The touch coordinate map 344 is data for associating touch coordinates determined through the touch operation with display coordinates on the display 14. This means that results of the touch operation performed on the touch panel 16 (FIG. 1A) are reflected in display on the display 14 based on the touch coordinate map 344.

The touch flag 346 is a flag for determining whether the touch panel 16 is touched. The touch flag 346 is configured by a one-bit register, for example. When the touch flag 346 is turned on (flagged), a data value "1" is set to the register. On the other hand, when the touch flag 346 is turned off (not flagged), a data value "0" is set to the register. The touch flag 346 is turned on and off based on output of the touch panel control circuit 48.

The first background flag 348 is a flag indicating whether the first navigation function, i.e., the map function, is set to be performed in the background. The second background flag 350 is a flag indicating whether the second navigation function, i.e., the AR function, is set to be performed in the background.

The location counter 352 is a counter for locating the current position at predetermined time intervals. Counting starts when the location counter 352 is initialized, and expires when a predetermined time has elapsed. The location counter 352 is also referred to as a location timer.

In the data storage area 304, incoming emails may be stored, and another flag or timer (counter) required to execute a program may be provided.

Figure 16:
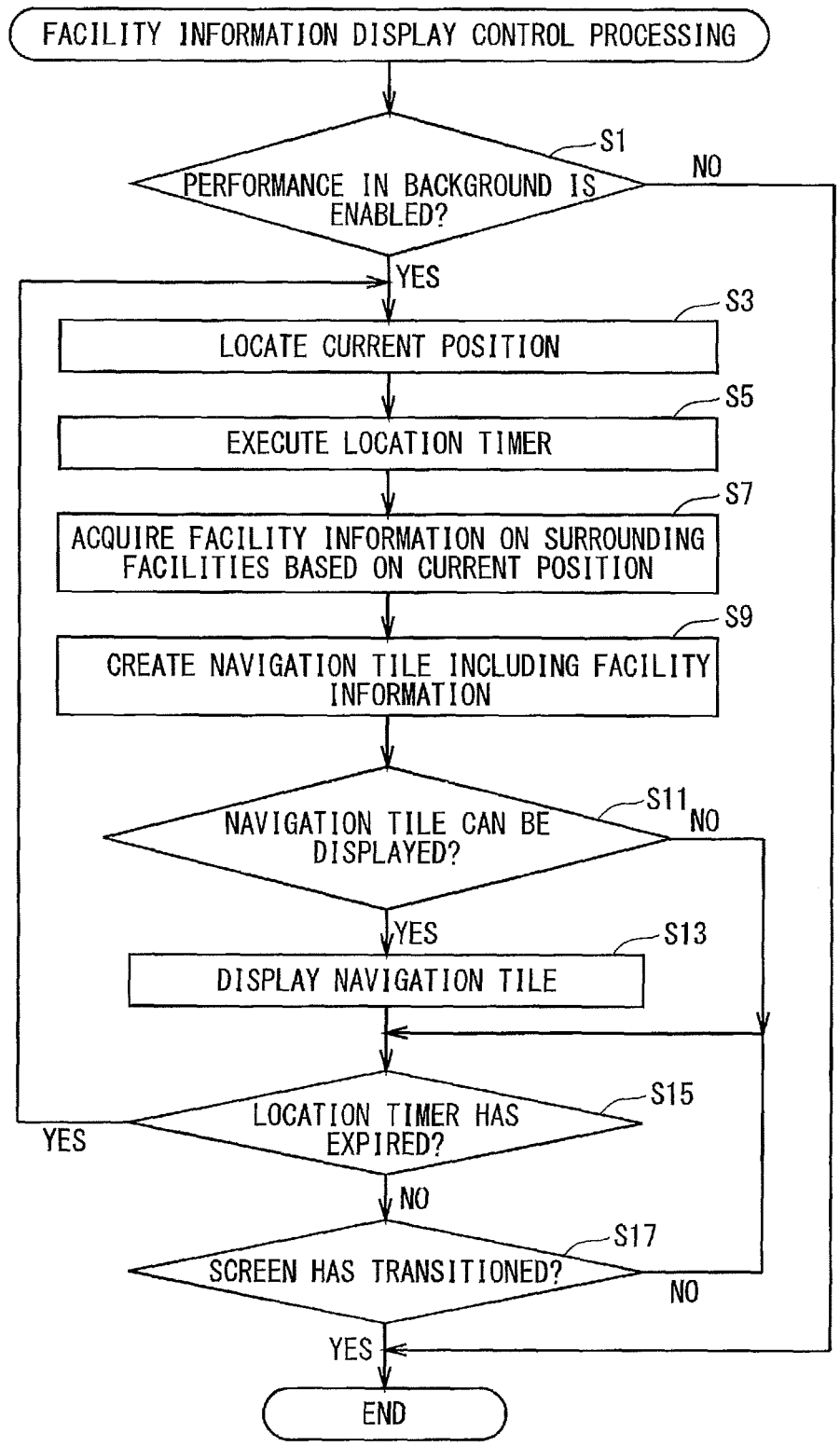
FIG. 16 illustrates a flow chart showing an example of facility information display control processing performed by a processor.
Figure 17:
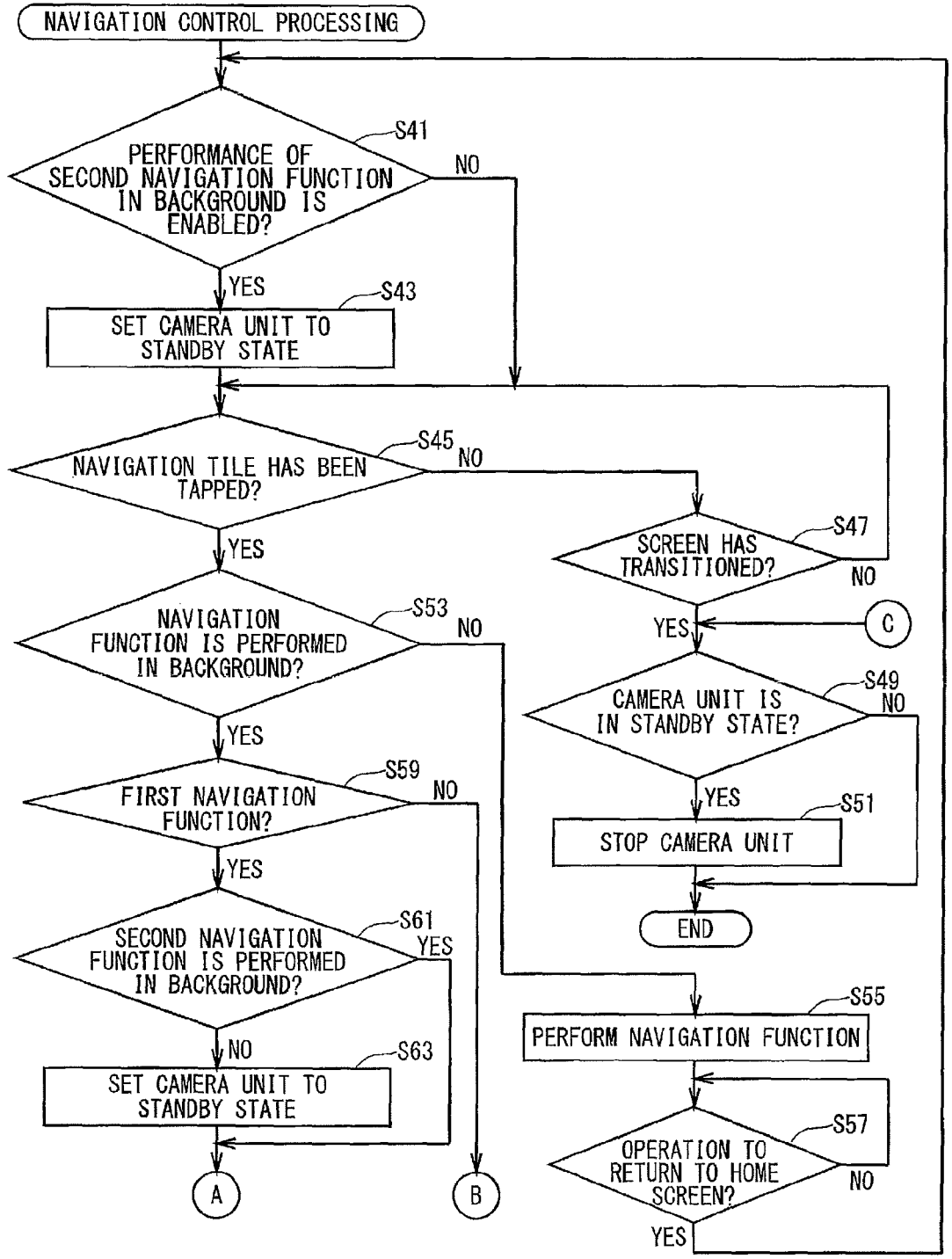
FIG. 17 illustrates a flow chart showing an example of navigation control processing performed by the processor.
Figure 18:
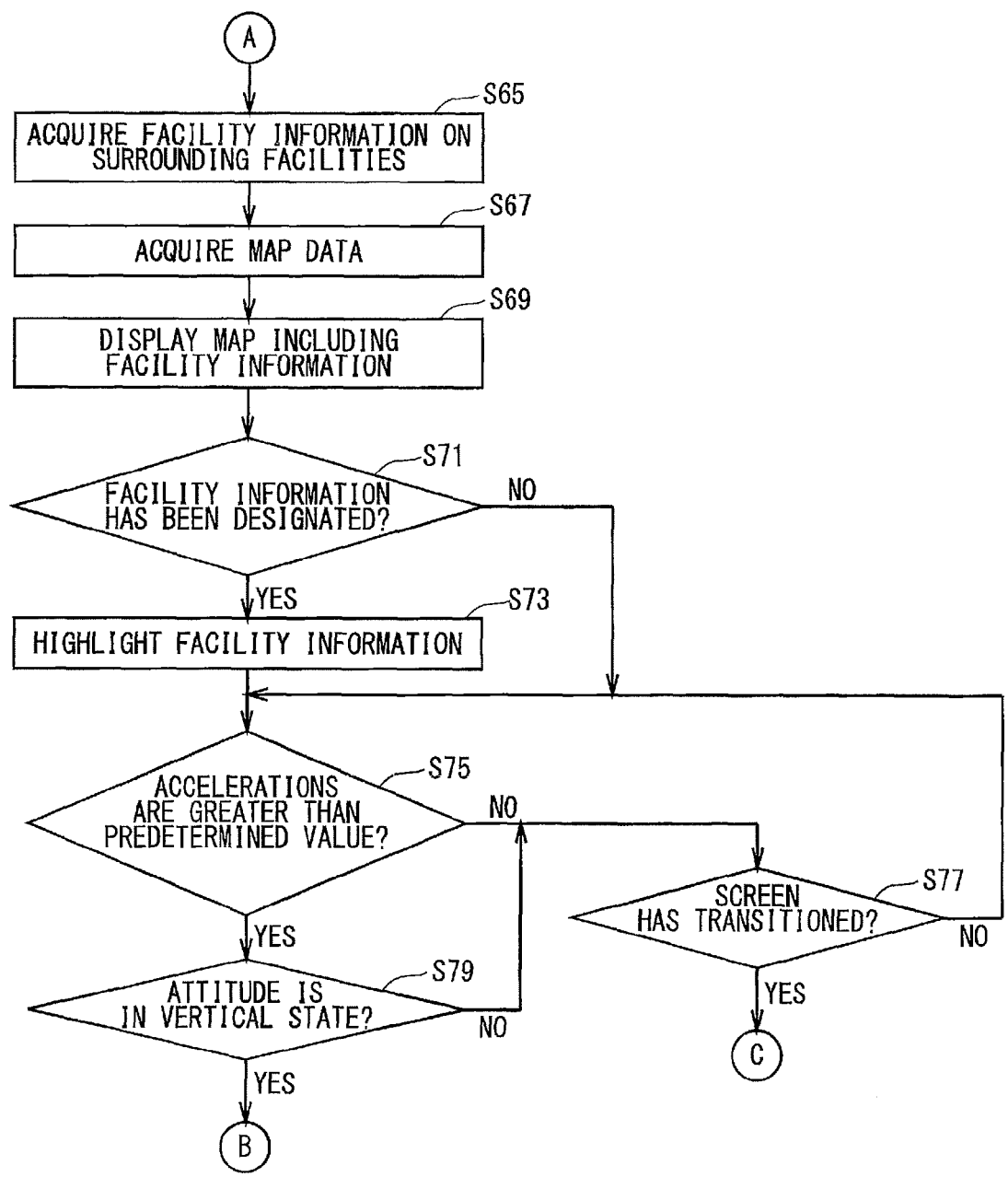
FIG. 18 illustrates a flow chart showing another example of the navigation control processing performed by the processor.
Figure 19:
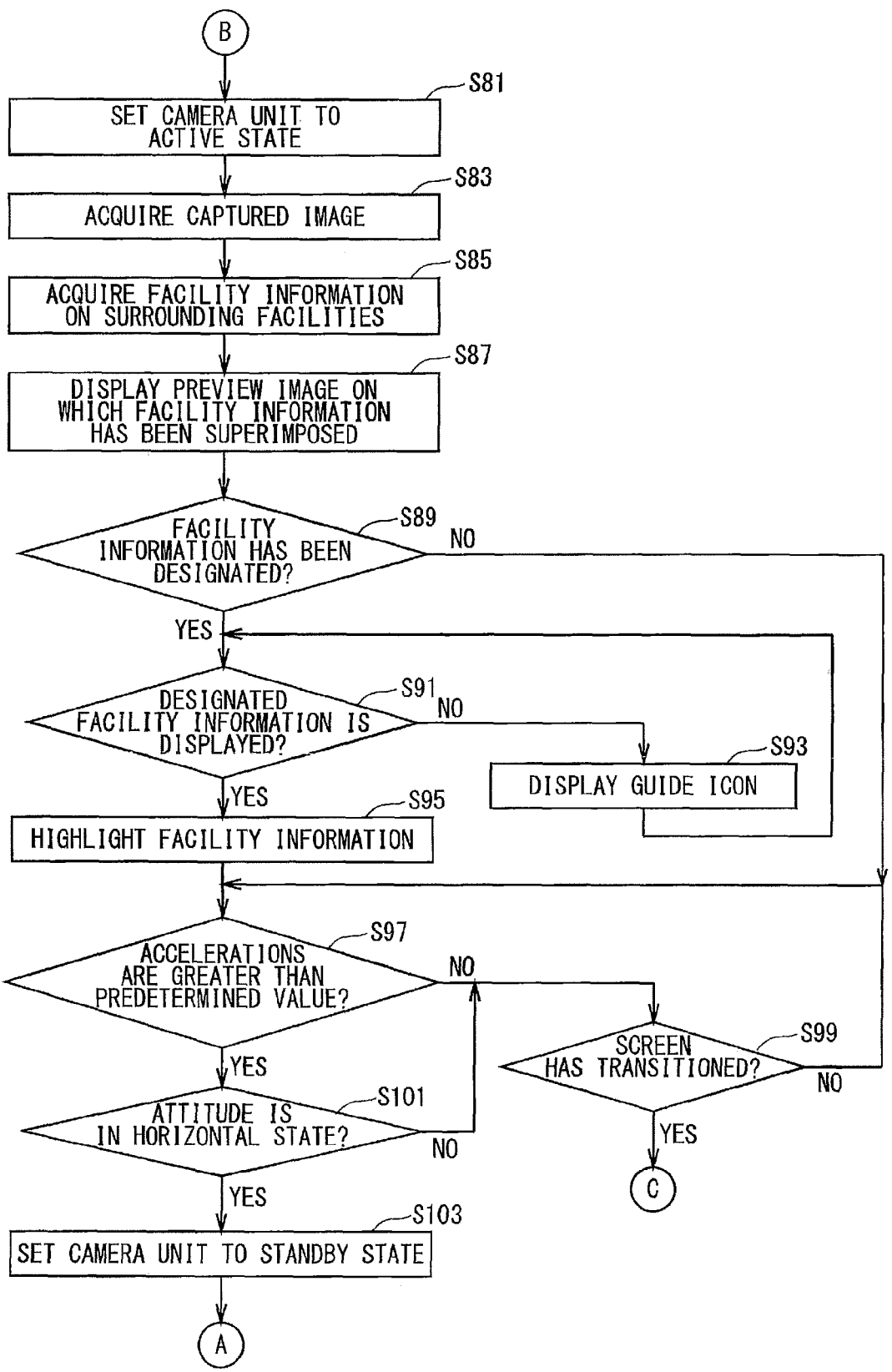
FIG. 19 illustrates a flow chart showing yet another example of the navigation control processing performed by the processor.
Figure 20:
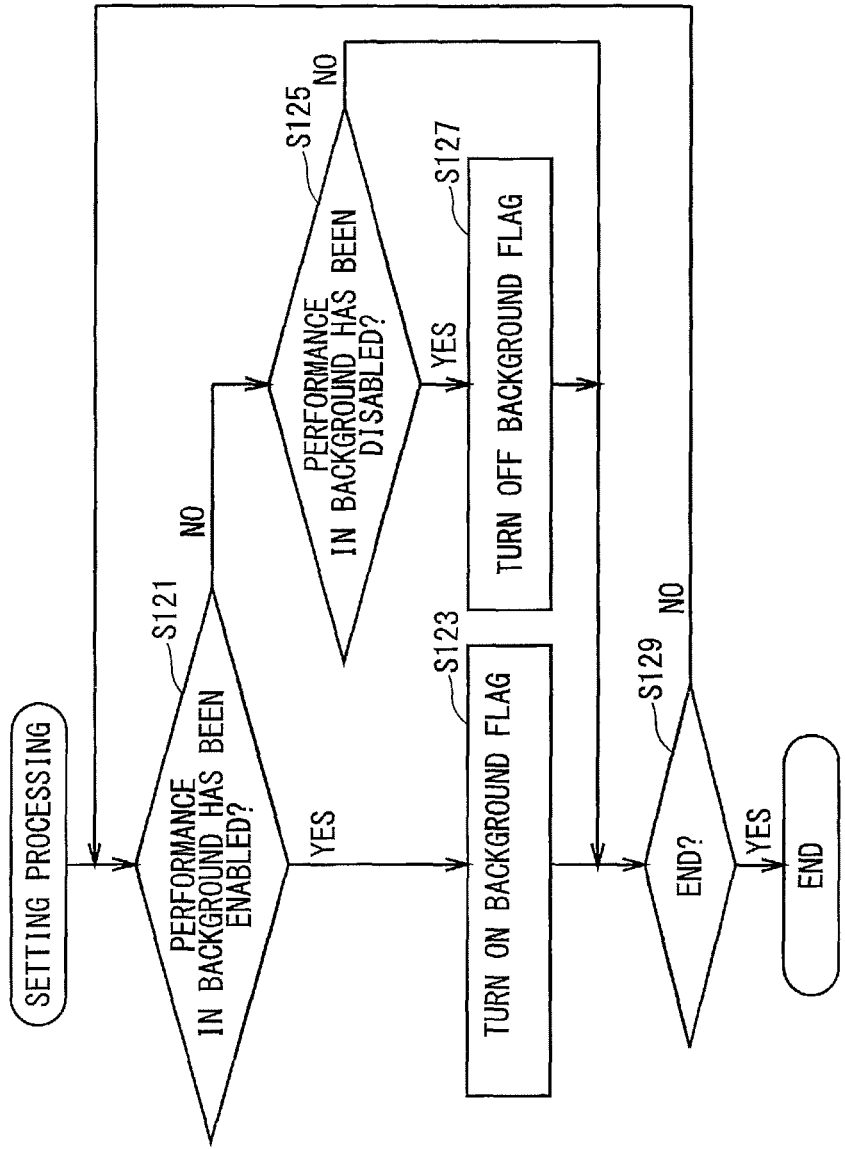
FIG. 20 illustrates a flow chart showing an example of setting processing performed by the processor.

The processor 30 can process a plurality of tasks, including facility information control processing illustrated in FIG. 16, navigation control processing illustrated in FIGS. 17 to 19, and setting processing illustrated in FIG. 20, in parallel under control of an OS, such as a Windows®-based OS and a Linux®-based OS including Android® and iOS®.

FIG. 16 illustrates the flow chart of the facility information display control processing. The facility information display control processing starts when the home screen is displayed, for example. The processor 30 (FIG. 2) determines whether performance in the background is enabled in step S1. This means that it is determined whether at least one of the first background flag 348 (FIG. 15) and the second background flag 350 (FIG. 15) is on. If "NO" in step S1, i.e., the two flags are off, the processor 30 ends the facility information display control processing.

If "YES" in step S1, e.g., the first background flag 348 is on to enable performance of the map function in the background, the processor 30 locates the current position in step S3. This means that the processor 30 issues a command to the GPS circuit 52 (FIG. 2) so that the GPS circuit 52 locates the current position. The results of the location are stored in the current position buffer 334.

Next, the processor 30 executes the location timer in step S5. This means that the location counter 352 (FIG. 15) is initialized to locate the current position at predetermined time intervals.

Next, the processor 30 acquires the facility information on surrounding facilities based on the current position in step S7. This means that the processor 30 transmits the current position stored in the current position buffer 334 (FIG. 15) to the data server 102 (FIG. 2), and acquires the facility information on facilities located around the current position from the database in the data server 102.

Next, the processor 30 creates a navigation tile including the facility information in step S9. This means that the processor 30 extracts facility information on the closest facility to the current position and the second closest facility to the current position from the acquired facility information, and creates the navigation tile in which the facility information F on the two facilities is displayed. In this case, the map tile in which the facility information F is displayed is created when the first background flag 348 is on, and the AR tile in which the facility information F is displayed is created when the second background flag 350 is on. This means that the navigation tile corresponding to the function performed in the background is created. The created tile is stored in the tile buffer 342.

Next, the processor 30 determines whether the navigation tile can be displayed in step S11. For example, in a case where the map tile is created, it is determined whether the home screen is scrolled so that the map tile can be displayed. If "NO" in step S11, e.g., the map tile cannot be displayed as illustrated in FIG. 5B, the processor 30 proceeds to processing in step S15. On the other hand, if "YES" in step S11, e.g., the map tile can be displayed as illustrated in FIG. 5A, the processor 30 displays the navigation tile in step S13. For example, when the created map tile is stored in the tile buffer 342, the map tile is displayed in the home screen. The processor 30 functions as a display processor when performing processing in step S13.

Next, the processor 30 determines whether the location timer has expired in step S15. This means that it is determined whether the predetermined time has elapsed since location of the current position. If "YES" in step S15, i.e., the location timer has expired as the predetermined time has elapsed since location of the current position, the processor 30 returns to processing in step S3. On the other hand, if "NO" in step S15, i.e., the predetermined time has not elapsed since location of the current position, the processor 30 determines whether the screen has transitioned in step S17. For example, it is determined whether the home screen has transitioned to another screen. If "NO" in step S17, i.e., the home screen remains displayed, the processor 30 returns to processing in step S15. On the other hand, if "YES" in step S17, e.g., any function is performed to cause display on the display 14 to transition from the home screen to a screen of the function, the processor 30 ends the facility information display control processing. It is determined to be "YES" in step S17 when the display 14 is powered off.

FIGS. 17 to 19 illustrate the flow charts of the navigation control processing. Symbols A, B, and C in FIGS. 17 to 19 each represent a link to the same symbol on another page.

As with the facility information display control processing, the navigation control processing starts when the home screen is displayed, for example. As illustrated in FIG. 17, the processor 30 (FIG. 2) determines whether performance of the second navigation function in the background is enabled in step S41. This means that it is determined whether the second background flag 350 is on to set the AR function so that the AR function is performed in the background. If "NO" in step S41, i.e., the second navigation function (AR function) is not set to be performed in the background, the processor 30 proceeds to processing in step S45. On the other hand, if "YES" in step S41, i.e., the second navigation function is set to be performed in the background, the processor 30 sets the camera unit 58 (FIG. 2) to the standby state in step S43. This means that the camera unit 58 is set to the standby state to reduce time required to display the preview image when the tap operation is performed on the AR tile.

Next, the processor 30 determines whether the navigation tile has been tapped in step S45. This means that it is determined whether the tap operation has been performed on the map tile or the AR tile. If "NO" in step S45, i.e., the tap operation has been performed on neither the map tile nor the AR tile, the processor 30 determines whether the screen has transitioned in step S47 as in step S17.

If "YES" in step S47, e.g., display on the display 14 (FIG. 1A) has been switched to a screen of another function, the processor 30 determines whether the camera unit 58 is in the standby state in step S49. If "NO" in step S49, i.e., the camera unit 58 is not in the standby state, the processor 30 ends the navigation control processing.

On the other hand, if "YES" in step S49, i.e., the AR function (second navigation function) is set to be performed in the background, and the camera unit 58 is in the standby state, the processor 30 stops the camera unit 58 in step S51. The camera unit 58 is stopped because the screen has transitioned to eliminate the need to perform the second navigation function in the background. When processing in step S51 ends, the processor 30 ends the navigation control processing. If "NO" in step S47, i.e., the home screen remains displayed, the processor 30 returns to processing in step S45.

If "YES" in step S45, i.e., the tap operation has been performed on the map tile or the AR tile, the processor 30 determines whether the navigation function is performed in the background in step S53. This means that it is determined whether the navigation function corresponding to the navigation tile on which the tap operation has been performed is performed in the background. Specifically, it is determined whether the background flag of the navigation function corresponding to the navigation tile on which the tap operation has been performed is on.

If "NO" in step S53, e.g., the AR function is not set to be performed in the background, and the tap operation has been performed on the AR tile, the processor 30 performs the navigation function in step S55. For example, the AR function is performed.

Next, the processor 30 determines whether an operation to return to the home screen has been performed in step S57. For example, it is determined whether the menu key 22c (FIG. 1A) to display the home screen has been operated. If "NO" in step S57, i.e., the operation to return to the home screen has not been performed, the processor 30 repeats processing in step S57.

On the other hand, if "YES" in step S57, e.g., the menu key 22c has been operated, the processor 30 returns to processing in step S41. This means that the processor 30 performs processing in step S41 again as settings may be changed so that the navigation function having been performed is performed in the background.

If "YES" in step S53, i.e., the tap operation has been performed on the navigation tile corresponding to the navigation function performed in the background, the processor 30 determines whether the navigation function is the first navigation function in step S59. This means that it is determined whether the tap operation has been performed on the map tile corresponding to the map function, which is the first navigation function.

If "NO" in step S59, i.e., the navigation tile on which the tap operation has been performed is the AR tile corresponding to the AR function, which is the second navigation function, the processor 30 proceeds to processing in step S81 illustrated in FIG. 19.

On the other hand, if "YES" in step S59, i.e., the tap operation has been performed on the map tile, the processor 30 determines whether the second navigation function is performed in the background in step S61. This means that it is determined whether the second background flag 350 (FIG. 15) is on. If "YES" in step S61, i.e., the AR function, which is the second navigation function, is performed in the background, the processor 30 proceeds to processing in step S65. If "NO" in step S61, i.e., the AR function is not performed in the background, the processor 30 sets the camera unit 58 to the standby state in step S63 as in step S43. When processing in step S63 ends, the processor 30 proceeds to processing in step S65 illustrated in FIG. 18.

The processor 30 acquires the facility information on surrounding facilities in step S65 illustrated in FIG. 18, and acquires the map data in step S67. This means that the processor 30 transmits the current position stored in the current position buffer 334 (FIG. 15) to the data server 102 (FIG. 2) to acquire the facility information on facilities located within the predetermined distance from the current position and the map data indicating the current position from the database in the data server 102.

Next, the processor 30 displays the map including the facility information in step S69. For example, the map including the facility information is displayed on the display 14 as illustrated in FIG. 11B.

Next, the processor 30 determines whether the facility information F has been designated in step S71. This means that it is determined whether the tap operation has been performed on the facility information F displayed in the map tile. If "NO" in step S71, e.g., the tap operation has been performed on the outside of the facility information F in the map tile as illustrated in FIG. 11A, the processor 30 proceeds to processing in step S75.

On the other hand, if "YES" in step S71, i.e., the tap operation has been performed on the facility information F displayed in the map tile, the processor 30 highlights the facility information in step S73. For example, when the tap operation has been performed on the facility information Fa "XX SUPERMARKET" as illustrated in FIG. 12A, the pop-up window is provided to the facility information "XX SUPERMARKET", and the thickness of a line enclosing the facility information is changed as illustrated in FIG. 12B.

Next, the processor 30 determines whether the accelerations are greater than a predetermined value in step S75. This means that it is determined whether there has been movement to change the attitude of the mobile phone 10 based on data on the accelerations. Specifically, the data on the accelerations is read from the attitude buffer 332 (FIG. 15), and it is determined whether the data on the accelerations is greater than the predetermined value. If "NO" in step S75, i.e., there has been no movement to change the attitude of the mobile phone 10, the processor 30 determines whether the screen has transitioned in step S77. For example, it is determined whether the menu key 22c to display the home screen has been operated.

If "YES" in step S77, e.g., the screen of the map function has transitioned to the home screen, the processor 30 returns to processing in step S49 illustrated in FIG. 17. If "NO" in step S77, i.e., the screen of the map function remains displayed, the processor 30 returns to processing in step S75.

If "YES" in step S75, i.e., there has been movement to change the attitude of the mobile phone 10, the processor 30 determines whether the attitude is in the vertical state in step S79. This means that it is determined whether the mobile phone 10 is in the vertical state based on the data on the angular velocities stored in the attitude buffer 332. If "NO" in step S79, i.e., the mobile phone 10 is not in the vertical state, the processor 30 returns to processing in step S77. If "YES" in step S79, i.e., the mobile phone 10 is in the vertical state, the processor 30 proceeds to processing in step S81 illustrated in FIG. 19.

When the tap operation is performed on the AR tile or the mobile phone 10 is moved to be in the vertical state in a state in which the AR function is performed in the background, the processor 30 sets the camera unit 58 (FIG. 2) to the active state in step S81 of FIG. 19. This means that the camera unit 58 is set to the active state to display the preview image in the screen of the AR function. Next, the processor 30 acquires the captured image in step S83. This means that the captured image is acquired from the captured image buffer 340 (FIG. 15). Next, the processor 30 acquires the facility information on surrounding facilities in step S85 as in step S65. Next, the processor 30 displays the preview image on which the facility information has been superimposed in step S87. For example, as illustrated in FIG. 11C, the preview image on which the facility information has been superimposed is displayed on the display 14.

Next, the processor 30 determines whether the facility information has been designated in step S89 as in step S71 illustrated in FIG. 18. If "NO" in step S89, e.g., the facility information has not been designated as illustrated in FIG. 11A, the processor 30 proceeds to processing in step S97.

If "YES" in step S89, i.e., the facility information has been designated, the processor 30 determines whether the designated facility information is displayed in step S91. This means that it is determined whether the lens of the camera unit 58 is directed to a facility corresponding to the designated facility information. It is determined to be "YES" in step S89 when the facility information is highlighted in the screen of the map function.

If "NO" in step S91, i.e., the designated facility information is not displayed, the processor 30 displays the guide icon Y in step S93, and returns to processing in step S91. For example, as illustrated in FIG. 13, the guide icon Y is displayed in the screen of the AR function to prompt the change in direction of the lens.

If "YES" in step S91, i.e., the designated facility information is displayed in the screen of the AR function, the processor 30 highlights the facility information in step S95. For example, as illustrated in FIG. 12C, a pop-up window is provided to the facility information, and the thickness of a line enclosing the facility information is changed.

Next, the processor 30 determines whether the accelerations are greater than the predetermined value in step S97 as in step S75.

If "NO" in step S97, i.e., there has been no movement to change the attitude of the mobile phone 10, the processor 30 determines whether the screen has transitioned in step S99 as in step S77.

If "YES" in step S99, e.g., the screen of the AR function has transitioned to the home screen, the processor 30 returns to processing in step S49 illustrated in FIG. 17. On the other hand, if "NO" in step S99, i.e., the screen of the AR function remains displayed, the processor 30 returns to processing in step S97.

If "YES" in step S97, i.e., there has been movement to change the attitude of the mobile phone 10, the processor 30 determines whether the attitude is in the horizontal state in step S101. This means that it is determined whether the mobile phone 10 is in the horizontal state. If "NO" in step S101, i.e., the mobile phone 10 is not in the horizontal state, the processor 30 returns to processing in step S99.

On the other hand, if "YES" in step S101, i.e., the mobile phone 10 is in the horizontal state, the processor 30 sets the camera unit 58 to the standby state in step S103. This means that the camera unit 58 is set to the standby state for power saving because the screen of the AR function has been switched to the screen of the map function to eliminate the need to display the preview image. When processing in step S103 ends, the processor 30 returns to processing in step S65 illustrated in FIG. 18 to display the screen of the map function.

The processor 30 functions as an acquisition unit when performing processing in steps S7, S65, and S85. The processor 30 functions as a map acquisition unit when performing processing in step S67. The processor 30 functions as an image acquisition unit when performing processing in step S83. The processor 30 functions as a first screen display processor when performing processing in step S69 or S87. The processor 30 functions as a second screen display processor when performing processing in steps S69 and S73 or steps S87 and S95. In particular, the processor 30 functions as a first map display processor when performing processing in step S69, and functions as a second map display processor when performing processing in steps S69 and S73. The processor 30 functions as a first image display processor when performing processing in step S87, and functions as a second image display processor when performing processing in steps S87 and S95.

FIG. 20 illustrates the flow chart of the setting processing. The setting processing starts when the setting key is operated to display a menu while the screen of the navigation function is displayed. The processor 30 determines whether performance in the background has been enabled in step S121. This means that it is determined whether an operation to enable performance of the navigation function in the background has been performed in a setting menu.

If "YES" in step S121, i.e., the operation to enable performance of the navigation function in the background has been performed, the processor 30 turns on the background flag in step S123. For example, when the operation to enable performance in the background has been performed in the function menu of the map function, the first background flag 348 (FIG. 15) is turned on. On the other hand, when the operation to enable performance in the background has been performed in the function menu of the AR function, the second background flag 350 (FIG. 15) is turned on. When processing in step S123 ends, the processor 30 proceeds to processing in step S129. The processor 30 functions as a setting unit when performing processing in step S123.

If "NO" in step S121, i.e., the operation to enable performance of the navigation function in the background has not been performed, the processor 30 determines whether performance in the background has been disabled in step S125. This means that it is determined whether an operation to disable performance of the navigation function in the background has been performed.

If "YES" in step S125, i.e., the operation to disable performance of the navigation function in the background has been performed, the processor 30 turns off the background flag in step S127. For example, the first background flag 348 is turned off when the operation to disable performance in the background has been performed in the function menu of the map function, and the second background flag 350 is turned off when the operation to disable performance in the background has been performed in the function menu of the AR function. When processing in step S127 ends, the processor 30 proceeds to processing in step S129.

If "NO" in step S125, i.e., the operation to disable performance in the background has not been performed, the processor 30 determines whether the processing ends in step S129. This means that it is determined whether an operation to end the function menu has been performed. If "NO" in step S129, i.e., the operation to end the function menu has not been performed, the processor 30 returns to processing in step S121. On the other hand, if "YES" in step S129, i.e., the operation to end the function menu has been performed, the processor 30 ends the setting processing.

In other embodiments, in a case where the facility information is acquired from the database in the data server 102, the number of communications with the data server 102 may be reduced by acquiring the facility information on a wide range of facilities in advance. In this case, time required to display the facility information can be reduced, and power consumption of the mobile phone 10 can be reduced.

In other embodiments, switching between the screen of the map function and the screen of the AR function may be performed when the menu key 22c is pressed twice or when the mobile phone 10 changes from a lengthwise state to a crosswise state.

In yet other embodiments, the current position may be located using communication with an access point (AP) of a wireless LAN and the base station.

Although the database of the map data and the database of the facility information are stored in the data server 102 (FIG. 2) in one embodiment, these databases may be stored in the flash memory 44 (FIG. 2) of the mobile phone 10.

In one embodiment described above, a term "greater than" the predetermined value is used, but the state of being "greater than a threshold" includes the state of being "equal to or greater than the threshold".

The programs used in one embodiment may be stored in an HDD of a server for data distribution, and may be distributed to the mobile phone 10 through a network. A recording medium, such as an optical disk including CD, DVD, and Blue-ray Disk (BD), USB memory, and a memory card, storing a plurality of programs may be sold or distributed. When programs downloaded through the above-mentioned server, recording medium, and the like are installed on a mobile phone having equivalent configuration to that in one embodiment, equivalent effects to those obtained in one embodiment can be obtained.

Specific numerical values appearing in the present specification are mere examples, and can appropriately be changed in accordance with the change of specifications of products and the like.

While the present disclosure has been described in detail, the foregoing description is in all aspects illustrative and not restrictive. Numerous modifications not having been described can be devised without departing from the scope of the present disclosure.

The invention claimed is:

1. An electric device comprising:
a location detector configured to detect a current position;
a display configured to display an object for performing an application in an area of a screen; and
at least one processor configured to acquire information of one or more geographic locations near the current position from a database and cause the display to display the information in the area, wherein
when at least one part of the information is selected, the at least one processor is configured to cause the display to superimpose, on the area, a map screen of the application relevant to a map function in which the at least one part is highlighted.

2. The electric device according to claim 1, wherein
the location detector is configured to detect the current position at predetermined time intervals, and
the at least one processor is configured to acquire the information from the database based on the current position detected at predetermined time intervals.

3. The electric device according to claim 1, wherein
the object comprises a first object for performing the application relevant to the map function and a second object for performing the application relevant to an augmented reality (AR) function, and
the at least one processor is configured to cause the display to display at least one of the first object and the second object.

4. The electric device according to claim 1, further comprising
a switching operation detector configured to detect a switching operation, wherein
the at least one processor is configured to cause the display to superimpose, on the area, one of a map screen of the application relevant to a map function and an augmented reality (AR) screen of the application relevant to an AR function, and when the switching operation detector detects the switching operation, the at least one processor is configured to switch between the map screen and the AR screen.

5. The electric device according to claim 4, wherein
the switching operation detector comprises an attitude sensor that detects an attitude of the electric device.

6. The electric device according to claim 1, wherein
the location detector is configured to detect the current position when the application is performed in a background.

7. An electric device comprising:
a location detector configured to detect a current position;
a display configured to display an object for running an application in an area of a screen; and
at least one processor configured to acquire information of one or more geographic locations near the current position from a database and cause the display to display the information in the area, wherein
when at least one part of the information is selected, the at least one processor is configured to cause the display to superimpose, on the area, a map screen of the application relevant to a map function in which the at least one part is highlighted.

8. The electric device according to claim 7, wherein if the location detector does not detect the current position, the at least one processor is configured not to cause the display to display the information.

9. The electric device according to claim 7, wherein when the application is running in a background, the at least one processor is configured to cause the display to display a preview image of the application in the area.

10. The electric device according to claim 7, wherein the at least one processor is configured to cause the display to display the information and a preview image of the application in the area.

11. The electric device according to claim 10, wherein the at least one processor is configured to cause the display to display the information not to overlap with the preview image.

12. An information display method for use in an electric device including a location detector that detects a current position, a display that displays an object for performing an application in an area of a screen, and at least one processor, and a switching operation detector configured to detect a switching operation, wherein
the at least one processor performs:
an acquisition step of acquiring information of one or more geographic locations near the current position from a database;
a display processing step of causing the display to display the information in the area; and
a superimposing step of superimposing the display, wherein
the at least one processor is configured to cause the display to superimpose, on the area, one of a map screen of the application relevant to a map function and an augmented reality (AR) screen of the application relevant to an AR function, and when the switching operation detector detects the switching operation, the at least one processor is configured to switch between the map screen and the AR screen.

* * * * *